United States Patent
Slotznick

(10) Patent No.: US 11,282,532 B1
(45) Date of Patent: Mar. 22, 2022

(54) PARTICIPANT-INDIVIDUALIZED AUDIO VOLUME CONTROL AND HOST-CUSTOMIZED AUDIO VOLUME CONTROL OF STREAMING AUDIO FOR A PLURALITY OF PARTICIPANTS WHO ARE EACH RECEIVING THE STREAMING AUDIO FROM A HOST WITHIN A VIDEOCONFERENCING PLATFORM, AND WHO ARE ALSO SIMULTANEOUSLY ENGAGED IN REMOTE AUDIO COMMUNICATIONS WITH EACH OTHER WITHIN THE SAME VIDEOCONFERENCING PLATFORM

(71) Applicant: Benjamin Slotznick, Mt. Gretna, PA (US)

(72) Inventor: Benjamin Slotznick, Mt. Gretna, PA (US)

( * ) Notice: Subject to any disclaimer, the term of this patent is extended or adjusted under 35 U.S.C. 154(b) by 0 days.

(21) Appl. No.: 17/459,250

(22) Filed: Aug. 27, 2021

Related U.S. Application Data

(63) Continuation of application No. 17/317,218, filed on May 11, 2021, now Pat. No. 11,107,490.

(Continued)

(51) Int. Cl.
*G10L 21/0232* (2013.01)
*H04N 7/15* (2006.01)
(Continued)

(52) U.S. Cl.
CPC .......... *G10L 21/0232* (2013.01); *G10L 25/57* (2013.01); *H04N 7/15* (2013.01);
(Continued)

(58) Field of Classification Search
CPC . G03B 15/03; G06F 3/03543; G06F 3/04817; G06F 3/0487; G06F 3/04812; G06F 3/1423; G06F 21/00; G10K 11/178; G10L 15/26; G10L 21/0208; G10L 21/0232; G10L 25/57; G10L 2021/02082;
(Continued)

(56) References Cited

U.S. PATENT DOCUMENTS

| | | | |
|---|---|---|---|
| 6,178,237 B1 * | 1/2001 | Horn | H04M 3/56 379/202.01 |
| 7,058,168 B1 * | 6/2006 | Knappe | H04L 12/1822 370/260 |

(Continued)

OTHER PUBLICATIONS

"You Can't Always Get What You Want" in the live streaming One World concert on Apr. 19, 2020, using Zoom (<https://www.youtube.com/watch?v=N7pZgQepXfA>).

(Continued)

*Primary Examiner* — Gerald Gauthier
(74) *Attorney, Agent, or Firm* — Panitch Schwarze belisario & Nadel LLP

(57) ABSTRACT

Methods and systems are provided for participant-individualized audio volume control and host-customized audio volume control of streaming audio for a plurality of participants who are each receiving the streaming audio from a host within a videoconferencing platform, and who are also simultaneously engaged in remote audio communications with each other within the same videoconferencing platform.

16 Claims, 8 Drawing Sheets

Related U.S. Application Data

(60) Provisional application No. 63/024,205, filed on May 13, 2020.

(51) Int. Cl.
*G10L 25/57* (2013.01)
*G10L 21/0216* (2013.01)
*G10L 21/0208* (2013.01)

(52) U.S. Cl.
CPC ............ *G10L 2021/02082* (2013.01); *G10L 2021/02166* (2013.01)

(58) Field of Classification Search
CPC ....... G10L 2021/02166; G10L 21/0364; H04L 65/403; H04L 12/1822; H04L 12/1827; H04L 12/66; H04L 65/4015; H04L 65/1096; H04M 3/568; H04M 1/247; H04M 1/6016; H04M 3/42; H04M 3/56; H04M 9/082; H04N 7/147; H04N 7/15; H04N 7/157; H04N 7/142; H04N 7/152; H04R 3/005; H04R 27/00; G07F 17/32; H04S 7/305; H04W 84/18
USPC ............ 345/418; 348/14.03, 14.08; 370/260, 370/261; 379/158, 202.01, 204.01; 381/66; 463/25; 709/204; 455/416

See application file for complete search history.

(56) References Cited

U.S. PATENT DOCUMENTS

| | | | | |
|---|---|---|---|---|
| 7,127,487 B1* | 10/2006 | Wang | ............... | H04L 12/1822 709/204 |
| 7,653,013 B1* | 1/2010 | Moran | ............... | H04L 12/1822 370/261 |
| 8,447,023 B2* | 5/2013 | Nimri | ............... | H04N 7/15 379/202.01 |
| 8,630,208 B1* | 1/2014 | Kjeldaas | ............ | H04L 12/1822 370/260 |
| 8,670,537 B2* | 3/2014 | Metzger | .............. | H04M 3/568 379/202.01 |
| 8,804,577 B1* | 8/2014 | Kondapalli | ............ | H04N 7/15 370/261 |
| 9,350,869 B1* | 5/2016 | Lasser | ................ | H04M 3/563 |
| 9,516,476 B2* | 12/2016 | Milosevski | ........... | H04W 4/06 |
| 10,237,324 B1* | 3/2019 | DeLuca | ................. | H04N 7/147 |
| 10,629,220 B1 | 4/2020 | Nicholson et al. | | |
| 10,685,664 B1 | 6/2020 | Kristjansson et al. | | |
| 10,692,518 B2 | 6/2020 | Sereshki et al. | | |
| 10,735,597 B1 | 8/2020 | Zagorski et al. | | |
| 10,812,921 B1* | 10/2020 | Hinthorn | ............. | H04R 1/406 |
| 10,854,186 B1* | 12/2020 | Devireddy | ....... | G10K 11/17857 |
| 11,086,392 B1* | 8/2021 | Sztuk | ................. | G06F 3/0487 |
| 11,107,490 B1* | 8/2021 | Slotznick | ............. | H04N 7/15 |
| 2005/0078613 A1* | 4/2005 | Covell | ............ | H04L 29/06027 370/260 |
| 2008/0030496 A1* | 2/2008 | Lee | ........................ | G06F 9/453 345/418 |
| 2008/0267095 A1* | 10/2008 | Sekaran | ............. | H04L 12/66 370/260 |
| 2011/0261940 A1* | 10/2011 | Burt | ....................... | H04M 3/56 379/158 |
| 2012/0120184 A1 | 5/2012 | Fornell et al. | | |
| 2012/0120270 A1 | 5/2012 | Li et al. | | |
| 2012/0133728 A1* | 5/2012 | Lee | ........................ | H04N 7/15 348/14.08 |
| 2012/0184337 A1 | 7/2012 | Burnett et al. | | |
| 2012/0202587 A1* | 8/2012 | Allen | ................ | G07F 17/3225 463/25 |
| 2014/0119552 A1* | 5/2014 | Beaucoup | ............ | H04M 9/082 381/66 |
| 2014/0242959 A1* | 8/2014 | Virolainen | ............ | H04M 9/082 455/416 |
| 2014/0247319 A1* | 9/2014 | Anderson | ................ | H04N 7/15 348/14.08 |
| 2014/0267550 A1* | 9/2014 | Nimri | ..................... | H04N 7/152 348/14.03 |
| 2014/0307882 A1* | 10/2014 | LeBlanc | ................. | H04S 7/305 381/66 |
| 2016/0050504 A1* | 2/2016 | Browne | ................. | H04L 12/18 381/66 |
| 2016/0255126 A1* | 9/2016 | Sarris | ..................... | H04N 7/155 348/14.08 |
| 2016/0255203 A1* | 9/2016 | Kreiner | ................ | H04M 3/568 379/202.01 |
| 2016/0329063 A1* | 11/2016 | Wige | ..................... | G10L 21/034 |
| 2016/0352913 A1* | 12/2016 | Wu | ....................... | H04M 3/568 |
| 2017/0165569 A1* | 6/2017 | van Welzen | ............ | A63F 13/30 |
| 2017/0194015 A1 | 7/2017 | Buchner et al. | | |
| 2017/0279946 A1* | 9/2017 | Chang | .................. | H04R 29/001 |
| 2019/0043519 A1 | 2/2019 | Rosenkiewicz | | |
| 2019/0096384 A1 | 3/2019 | Sereshki et al. | | |
| 2020/0110572 A1* | 4/2020 | Lenke | ...................... | H04N 7/15 |
| 2020/0321007 A1* | 10/2020 | Stoker | .................... | H04N 7/155 |
| 2020/0349230 A1 | 11/2020 | Yoshioka et al. | | |
| 2020/0349953 A1 | 11/2020 | Qin et al. | | |
| 2021/0181774 A1 | 6/2021 | Powell et al. | | |
| 2021/0342020 A1* | 11/2021 | Jorasch | ................... | G06F 3/016 |
| 2021/0342785 A1* | 11/2021 | Mann | .................. | G06F 16/9536 |
| 2021/0352244 A1* | 11/2021 | Benedetto | .............. | H04N 7/152 |
| 2021/0360144 A1* | 11/2021 | Rosensweig | ....... | H04N 5/23206 |

OTHER PUBLICATIONS

Acoustic Echo Cancellation. Product description from DSP Algorithms. Downloaded from webpage: <https://www.dspalgorithms.com/w3/echo-cancellation/acoustic-echo-canceller.php>, download date: May 6, 2021; original posting date: unknown, 5 pages.

Andrew Eisele. Polarity vs. Phase: What's the Difference? Downloaded from webpage: <https://www.bhphotovideo.com/explora/pro-audio/tips-and-solutions/polarity-vs-phase-whats-the-difference#:~:text=Most%20mid%2Dlevel%20to%20high,of%20a%20signal%20in%20time.&text=The%20phase%20of%20a%20signal,point%2C%20is%20expressed%20in%20degrees>, download date: May 5, 2021; original posting date: B&H Photo, 2019, 4 pages.

Audacity Invert function. Audacity Development Manual, downloaded from: <https://manual.audacityteam.org/man/invert.html>, download date: May 3, 2021, original posting date: unknown, 2 pages.

Gather videoconferencing platform. Downloaded from: https://gather.town/, download date: May 3, 2021, original posting date: unknown, 5 pages.

Gatherly videoconferencing platform. Downloaded from: https://www.gatherly.io/, download date: May 3, 2021, original posting date: unknown, 5 pages.

Gupta et al., "Acoustic Echo Cancellation: All you need to know." EE Times, Apr. 3, 2009, downloaded from: <https://www.eetimes.com/acoustic-echo-cancellation-all-you-need-to-know/#>, 10 pages.

Hamilton Original Broadway Cast Zoom Performance "Alexander Hamilton" posted Apr. 8, 2020 on https://www.youtube.com/watch?v=cqvVL8lurMw.

Jami peer-to-peer videoconferencing platform. Downloaded from webpage: <https://jami.net/>, download date: May 4, 2021; original posting date: unknown, 9 pages.

Maryse Ziedler. <Virtual dance parties, happy hours spring up to tight against loneliness during COVID-19.> CBC News, downloaded from webpage: <https://www.cbc.ca/news/canada/british-columbia/virtual-social-distancing-1.5505099>, posted Mar. 21, 2020, 7 pages.

QuaranTeam dance party. Downloaded from: <https://www.eventbrite.ca/e/quaranteam-new-virtual-dance-and-festival-experience-be-yourself-tickets-100862129344>, download date: May 3, 2021, original posting date: unknown, 5 pages.

SonoBus peer-to-peer audio platform. Downloaded from webpage: <https://sonobus.net/>, download date: May 4, 2021; original posting date: unknown, 6 pages.

(56) References Cited

OTHER PUBLICATIONS

VocAlign by Synchro Arts product brochure. Downloaded from web page: <https://www.synchroarts.com/products/vocalign-ultra/overview>, download date: May 3, 2021, original posting date: unknown, 3 pages.

Wikipedia entry for "Audacity (audio editor)." Downloaded from web page: <https://en.wikipedia.org/wiki/Audacity_(audio_editor)>, page last edited on May 3, 2021, 8 pages.

Wikipedia entry for "Echo suppression and cancellation." Downloaded from webpage: <https://en.wikipedia.org/wiki/Echo_suppression_and_cancellation>, download date: May 3, 2021; page last edited: Mar. 31, 2021; original posting late: unknown, 6 pages.

Wikipedia entry for "Jami (software)." Downloaded from webpage: <https://en.wikipedia.org/wiki/Jami_(software)>, download date: May 4, 2021; page last edited: Apr. 24, 2021; original posting date: unknown, 4 pages.

Wonder videoconferencing platform. Wonder features. Downloaded from: <https://www.wonder.me/features>, download date: May 3, 2021, original posting date: unknown, 5 pages.

\* cited by examiner

Video Conferencing System Diagram

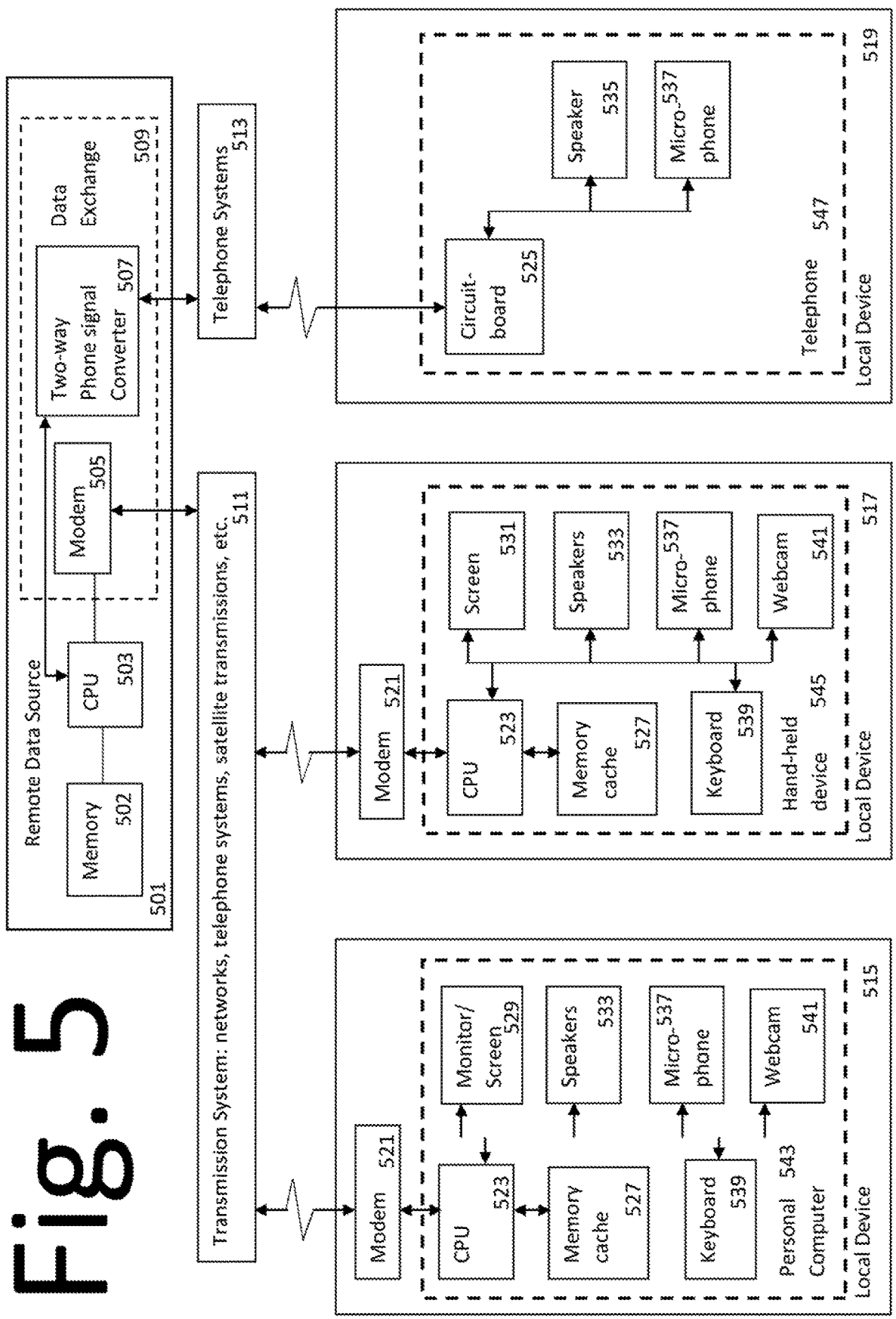

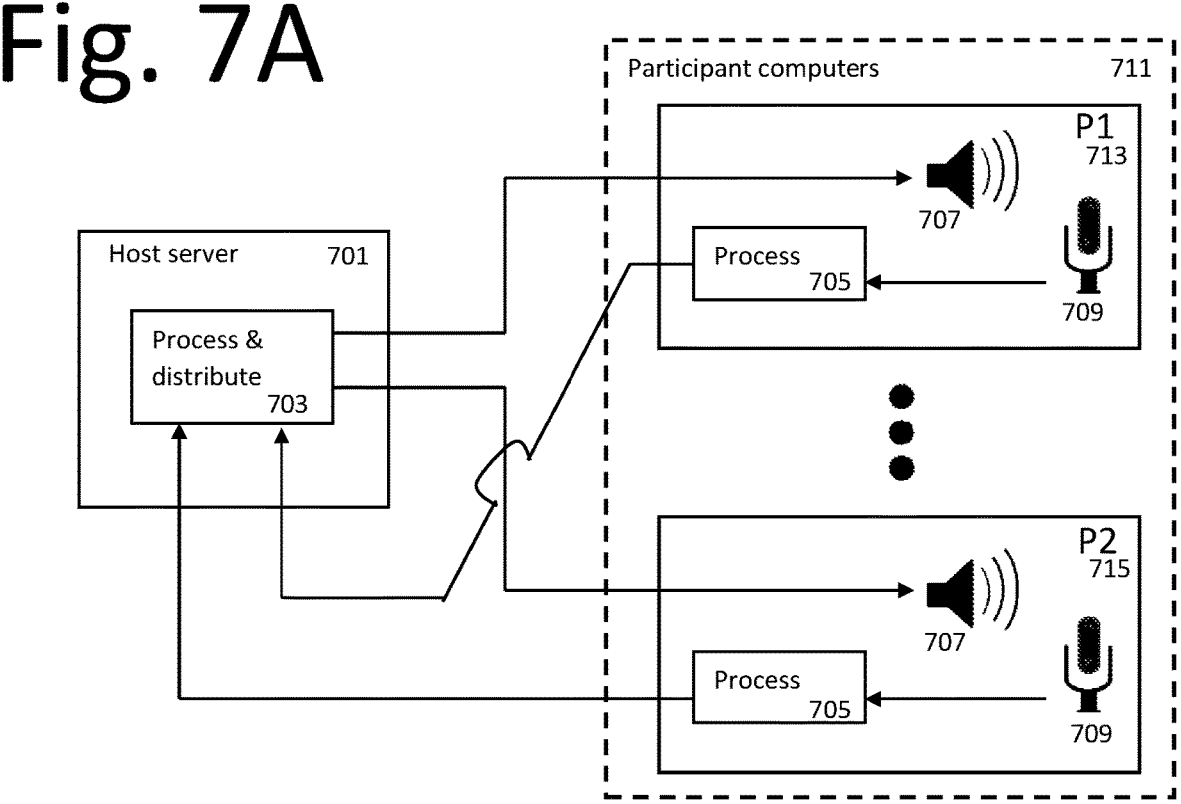
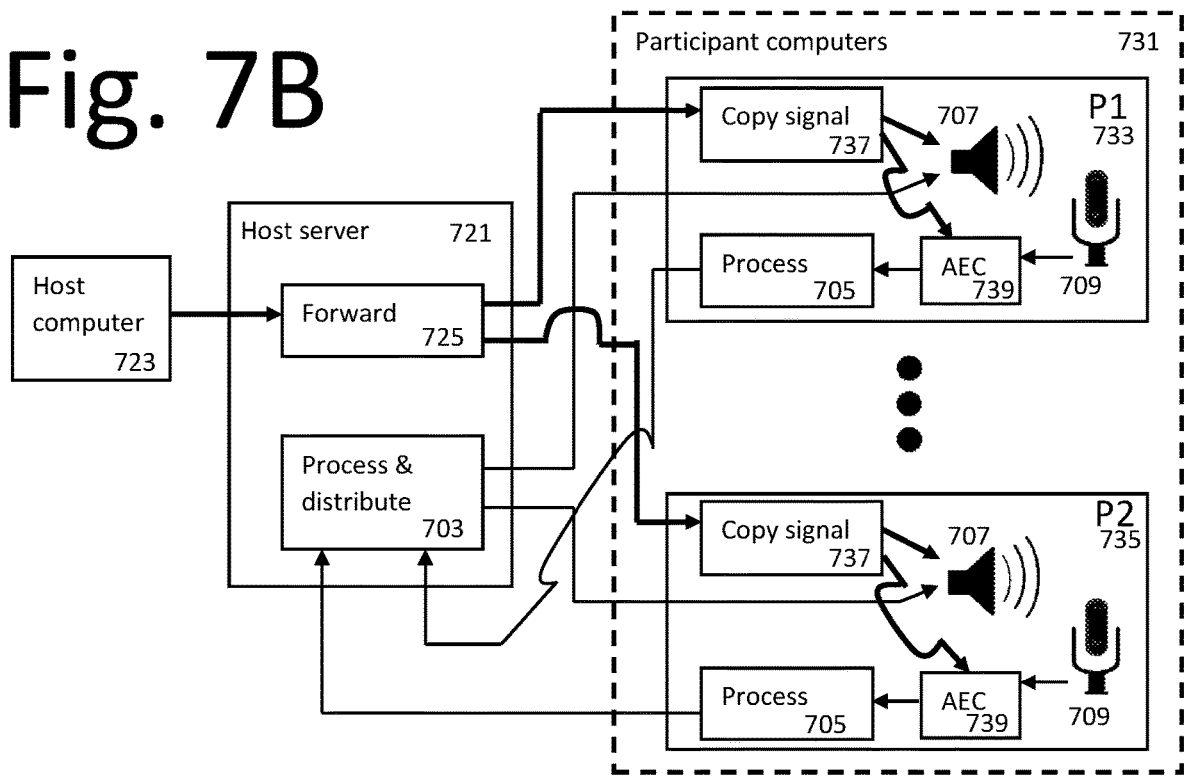

US 11,282,532 B1

PARTICIPANT-INDIVIDUALIZED AUDIO VOLUME CONTROL AND HOST-CUSTOMIZED AUDIO VOLUME CONTROL OF STREAMING AUDIO FOR A PLURALITY OF PARTICIPANTS WHO ARE EACH RECEIVING THE STREAMING AUDIO FROM A HOST WITHIN A VIDEOCONFERENCING PLATFORM, AND WHO ARE ALSO SIMULTANEOUSLY ENGAGED IN REMOTE AUDIO COMMUNICATIONS WITH EACH OTHER WITHIN THE SAME VIDEOCONFERENCING PLATFORM

CROSS-REFERENCE TO RELATED APPLICATIONS

This application is a continuation of U.S. Non-Provisional patent application Ser. No. 17/317,218 filed May 11, 2021, which is incorporated by reference herein.

This application claims priority to U.S. Provisional Patent Application No. 63/024,205 filed May 13, 2020, which is incorporated by reference herein.

BACKGROUND OF THE INVENTION

The general field of the invention is noise suppression in videoconferencing systems, software, hardware, and physical spaces. These systems are used so that people in different locations, physically remote from each other, can hold meetings in real time, both seeing and hearing each other during the meeting. Recent years have seen an increase in the use of videoconferencing systems and software such as Zoom®, Microsoft Teams®, Intermedia Unite® and AnyMeeting®, Cisco Webex® Meetings, ClickMeeting®, Google Meet™, Slack®, Zoho Meeting, and Join.Me®. Use has exploded during the coronavirus pandemic, with the accompanying shelter-in-place orders.

Such videoconferencing and teleconferencing systems employ the internet to connect people, each at physically separate (and distant) locations by way of each person's computing device including, but not limited to, a desktop computer, a laptop computer, a workstation, computer server, a smart phone, or a tablet computing device. In the discussions and descriptions below, mention of a computer or computing device, is intended to include all of the above, and any similar electronic device which performs similar computational functions.

A limitation on all of these systems is that they are not full-duplex, that is, only one person can talk at a time. When two people using two different audio streams try to talk at once, generally one is suppressed by the system or its software. Otherwise a combination of lag times, feedback, and echo, make the audio unintelligible. Extraneous background noise can create and contribute to such interference, feedback and echo. This is why such videoconferencing products employ filters (software and/or acoustic) to suppress persistent background noise, intermittent background noise, echoes, and other unnecessary sounds. Sources of peripheral background noise can include (but are not limited to) pets, children, street traffic, the sound of typing on a keyboard, a radio, a stereo system, instrumental music, a TV set, clinking of glasses, and whispering between two participants in the same physical room. Even a small amount of background noise can add up to unacceptable interference with audio quality, especially in a meeting with participants sending audio streams from many locations. Consequently, participants will often try to limit background noise (such as by turning off radios and stereos, closing windows and doors, or asking children to leave the room). For the same reason, the host of a video meeting will often ask participants to mute themselves when they are not talking. Likewise, many of the systems allow the host to mute all participants (or any particular participant) and unmute them one at a time or as needed for their participation in the discussion.

This also means that people in different locations cannot generally use these videoconferencing systems to sing or play music together in real time, at least not without suppressing the audio. In some limited cases, when the sound volume of a second speaker/singer is significantly lowered, and synchronicity of the two voices is not paramount, the system can allow more than one voice to be heard at the same time without unacceptable sound degradation. For example, the Rolling Stones judicious mastery of these limitations made for a wonderful live presentation of "You Can't Always Get What You Want" in the live streaming One World concert on Apr. 19, 2020, using Zoom (https://www.youtube.com/watch?v=N7pZgQepXfA). But this great performance also highlights these system limits and constraints.

There are a number of examples of choirs and orchestras on YouTube, which appear as if the singers and musicians were performing live over the internet on a platform such as Zoom. See for example: https://www.youtube.com/watch?v=cqvVL8IurMw (Hamilton Original Broadway Cast Zoom Performance "Alexander Hamilton" posted Apr. 8, 2020). However, a closer reading of the performance descriptions reveals that these were not live performances, but rather individual audio-video files sent individually to someone who combined them using audio-video editing equipment and software for later broadcast.

Software, such as Vocalign by Synchro Arts, using techniques known to those knowledgeable in the art, is designed to automatically align vocal overdub and replacement dialog on multi-track audio-video recordings when pitch and tempo of recordings differ. However, Zoom and other videoconferencing systems do not present the multiple audio streams in a way that such tools can align them in real time.

As is well known to practitioners of the art, a variety of methods are used to filter out noise in an audio signal. ("In audio, noise is generally any unpleasant sound and, more technically, any unwanted sound that is unintentionally added to a desired sound," https://whatis.techtarget.com/definition/audio-noise, emphasis added.) They include but are not limited to (a) removing all frequencies outside the normal conversational range of the human voice (above or below that range), (b) sampling persistent background sound, creating a frequency and volume model of it, and removing those sounds from the audio stream, (c) sampling the audio stream for footprints of a particular modeled intermittent noise (such as typing on a keyboard) and then actively removing those sounds from the audio stream, and (d) suppressing echoes by detecting a signal going in one direction on a circuit, recognizing when it re-appears, with some delay, in the audio signal, and then muting, attenuating, or subtracting it from the audio signal, often coming in the other direction.

One method of "subtracting" or "deleting" a portion of an audio signal is through polarity inversion, often referred to as phase inversion. When two otherwise identical audio waves with opposite phases are combined they cancel each other out. (See https://music.stackexchange.com/questions/66737/what-is-the-purpose-of-phase-invert.) For example, this signal cancellation sometimes happens when multiple microphones record a live audio session over separate channels. Many audio processing sound cards and mixers have a phase invert button or control for each channel to make adjustments to fix this. This cancellation property can also be used to edit an audio signal. For example, in Audacity (open-source, digital audio-editing software: https://en.wikipedia.org/wiki/Audacity_(audio_editor)) the invert function can be used to manually remove vocals from a sound track: https://manual.audacityteam.org/man/invert.html.

One feature of Zoom is the ability to create virtual break-out rooms or mini-sessions within a larger meeting. This has been increasingly used during the pandemic as a wider variety of enterprises (including schools and universities) have been forced to gather, teach, and solve problems online. Microsoft Teams and Google Meet have some similar features. When breakout rooms are used, each participant who is not a host (or co-host) is usually sent into one specific breakout room, or may remain in the original "room". Participants in each particular room can see and hear each other, and interact via text chat and sharing their computer screens. However, they cannot see, hear, or interact with the participants in any other room. (The host or co-host of the overall session can also participate in any room, but only one room at a time.) A reason for isolating the audio interactions to within each breakout room is to prevent the same kind of interference and feedback described previously.

A host can send a text message to all participants, regardless of which room the host is in, and every participant (regardless of which room he or she is in) can signal the host to request help. However, in order to prevent interference and echoes, the host in some videoconferencing platforms cannot speak to all participants in all rooms at the same time, or send other audio signals to all of them. In other videoconferencing platforms such as Wonder and Gatherly, the host can speak (send an audio-video stream) to all participants in all breakout rooms (sometimes referred to as "circles", "groups", or "floors" in those platforms). Indeed, in Gatherly, the host can send an audio-video stream to all participants on one particular "floor" but not other "floors". However such host broadcasts in Wonder and Gatherly, simultaneously mute all audio interaction among other non-host participants.

The issue of audio feedback, echo cancellation, and noise suppression is simplified when all participants wear headsets, headphones, or earphones. In that case, audio from the videoconference cannot come out of a user's loudspeaker and reenter the videoconference audio via the user's microphone. This may approximate (or become) full duplex. Some conferencing systems, such as Teooh (also known as "RoomKey"), require headsets, while others (such as Gatherly and gather.town) may just strongly recommend them. Other systems try to mute all but one speaking participant or sound source.

Though originally developed to aid workplace collaboration, video conferencing systems and tools have increasingly been used for social gatherings during the coronavirus pandemic. These gatherings include virtual happy hours, virtual luncheons, virtual birthday parties, virtual game nights, and virtual dance parties. Many of these efforts involve small groups, but others, especially dance parties such as those held by VYVE, involve hundreds of participants: https://www.cbc.ca/news/canada/british-columbia/virtual-social-distancing-1.5505099 (Virtual dance parties, happy hours spring up to fight against loneliness during COVID-19, posted Mar. 21, 2020). One problem with using a video-conferencing platform to host a dance party is that everyone except the disc jockey (or the person streaming the music) must be muted. If participants want to talk to each other, they would have to go into a breakout room, but then they wouldn't hear the music. One organizer of dance parties (QuaranTeam) ends the dance party with small breakout groups so that participants can socialize: https://www.eventbrite.ca/e/quaranteam-new-virtual-dance-and-festival-experience-be-yourself-tickets-100862129344.

A more natural experience would be if participants could leave the virtual "dance room" and go to a breakout room to talk, but still hear the music, though at a low enough volume to have a conversation in a natural voice—and then return at will to the "dance room" with its music. This would mimic being in a real nightclub, where attendees can leave the dance floor and move to a table or booth (which is more acoustically separate or distanced from the dance floor audio system), and where it is quiet enough to engage in conversation. Then attendees can return to the dance floor when they wish, or alternate between the dance floor and their table. However, mimicking such a "dance club" cannot be done using current videoconferencing platforms, systems or software.

SUMMARY OF THE INVENTION

In contrast with prior art, the present invention discloses a new way for audio in a videoconferencing system to be sent or streamed to all participants in a breakout room (or all participants in all breakout rooms) without causing interference or echoes when those in the breakout room speak to each other.

In contrast to current and prior art, the essence of the invention is to intentionally introduce sound (or rather sounds generally considered unwanted noise) in a controlled and knowing way, so that those sounds can then be removed using well-known noise reduction and echo cancellation techniques.

A preferred embodiment of the invention accomplishes this via three steps. A hub-and-spoke platform architecture is assumed in this first described embodiment, meaning that all audio-video streams are routed through a host server (or the host's computer) before being sent to individual participants. Alternate embodiments with similar steps (described subsequently) address platforms which employ peer-to-peer or more distributed architecture.

Step 1: An audio stream or signal (such as the host's voice or a dance tune) is intentionally sent from the host to every participant in the meeting's breakout rooms (the "Host-sent Audio")—while the system retains a digital copy of the frequency wave form of this signal for future reference and processing (referred to as the "Audio Signal Copy").

In a hub-and-spoke platform, the Audio Signal Copy is retained at the hub—a host server or host computer. The signal of the audio stream (the Host-sent Audio) is "played" on every participant's speaker, "heard" by every participant, and then detected by every participant's microphone.

Step 2: The Host-sent Audio when detected by the microphones of participants, is deleted from the audio streams that have been returned to the system/host for re-distribution To prevent the multiple instances of the Host-sent Audio signal from creating interference or feedback when fed back into the system, the system treats each intentionally Host-sent Audio, when detected by each participant's microphone, as if it were noise or an echo. Using techniques of echo suppression well known to those practitioners of the art, the system (in this embodiment at the host server) uses the waveform sound-print of the Audio Signal Copy to remove the wave-form of the Host-sent Audio from the audio stream that each participant's microphone detects. All that is left for re-distribution is the participant's voice. (The present invention permits all other noise reduction filters previously employed by a videoconferencing platform to be successfully applied.)

Consequently, if the participant is not speaking, even though the Host-sent Audio is playing for the participant at his or her location, the videoconferencing software will not re-distribute any audio signal back through the system. On the other hand, if the participant is speaking, the Host-sent Audio will be filtered out by the software, so that only the participant's voiced words ("Participant's Audio") will be sent back through the system on the return stream.

Step 3: The Participant Audio will be sent out to all other participants along with any new (or new portion of) Host-sent Audio.

The Host-sent Audio is by nature a continuing audio stream. However, these steps describe discrete time points in the process and discrete time points with respect to this continuing stream. When the system sends the Participant Audio out to other participants, it will also be sending a new portion of the continuing Host-sent Audio (if there is a new portion).

Whether or not these streams (Participant Audio and new portion of the Host-sent Audio) are mixed, the system will create and retain a new Audio Signal Copy of this new portion of the Host-sent Audio. In this way, Step 3 acts as a new Step 1 as the process repeats. The system may send the Participant Audio and the new Host-sent Audio on separate channels, employ separate frequency, or send instructions for recreating, coding, or modeling the new Host-sent Audio.

In an alternate preferred embodiment in a more distributed videoconferencing platform, the Audio Signal Copy is made at each participant's computer in Step 1. Then Step 2, the removal of the Host-sent Audio is performed at each participant's computer rather than a system server, so that the audio sent back to the system contains only that Participant Audio. Step 3 remains the same. FIGS. 2 and 3, more fully described below, illustrate such a more distributed platform.

In another alternative preferred embodiment for a videoconferencing platform based on peer-to-peer architecture, Step 1 and Step 2 are accomplished at each participant's computer. In Step 3, each participant's computer distributes its Participant Audio to the other participant computers, while the host computer continues to send the Host-sent Audio stream.

This is a new use of the noise-suppression and echo suppression technology for intentionally introduced audio streams. However, as will be obvious to those knowledgeable in the art, this system will not only allow Host-sent Audio to be heard by every participant in a breakout room, but will permit them to still converse intelligibly with each other without creating additional audio interference or feedback.

BRIEF DESCRIPTION OF THE DRAWINGS

The foregoing summary, as well as the following detailed description of the invention, will be better understood when read in conjunction with the appended drawings. For the purpose of illustrating the invention, there are shown in the drawings embodiments which are presently preferred. It should be understood, however, that the invention is not limited to the precise arrangements and instrumentalities shown. In the drawings:

FIG. 5 is a schematic view of major components of the video conferencing system shown in FIG. 4.

FIG. 7A is a schematic view of a hub-and-spoke videoconferencing platform in which noise suppression and echo cancellation are accomplished in a more distributed manner where at least some of the processing may occur at individual participant computers.

FIG. 7B is a schematic view of the processes involved when another preferred embodiment of the present invention is embodied in a hub-and-spoke platform with distributed processing as described in FIG. 7A.

DETAILED DESCRIPTION OF PREFERRED EMBODIMENTS

Figure 1:
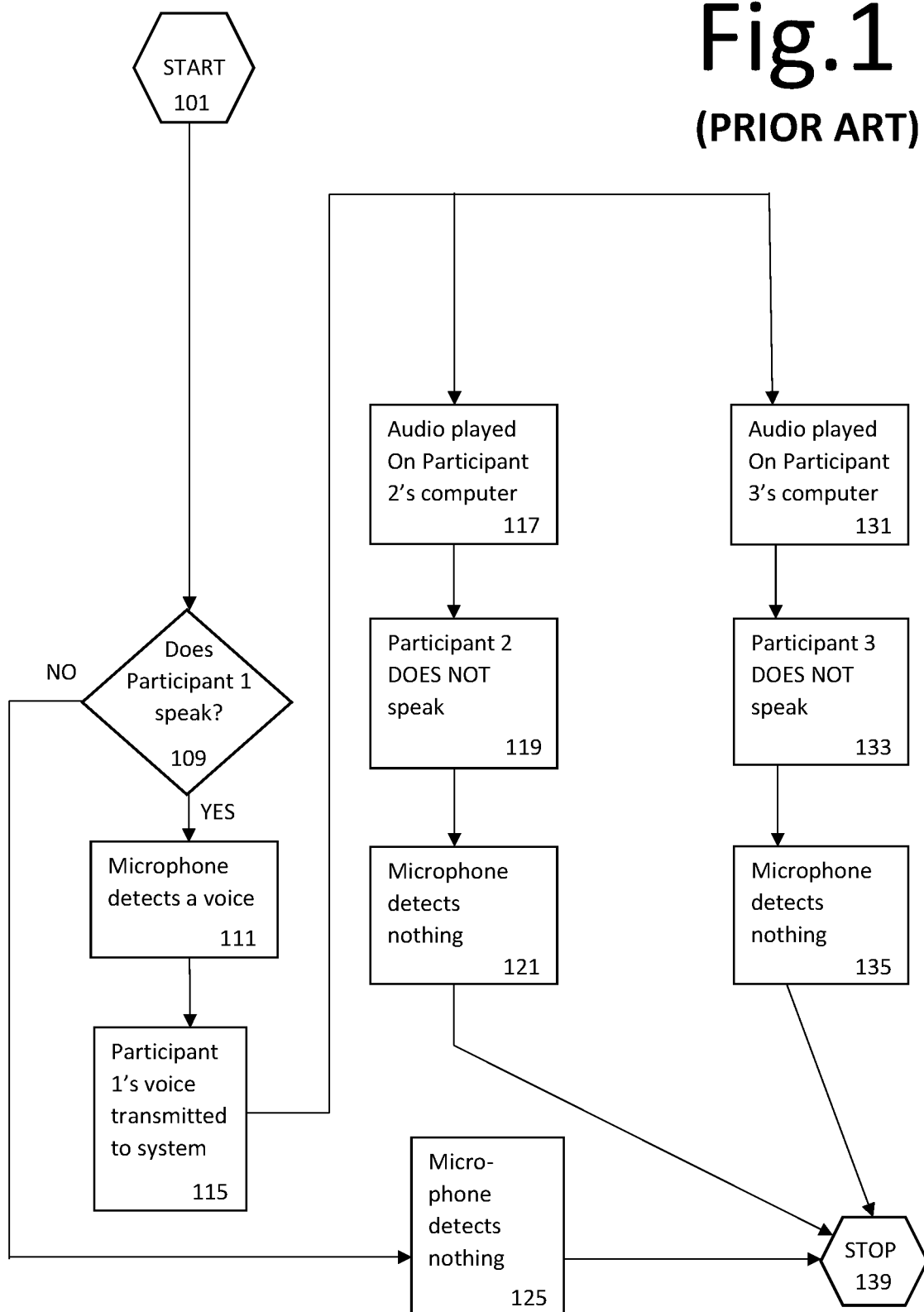
FIG. 1 is a flow chart of current (prior art) breakout room technology.

Certain terminology is used herein for convenience only and is not to be taken as a limitation on the present invention. The words "a" and "an", as used in the claims and in the corresponding portions of the specification, mean "at least one."

I. Terminology and Definitions

The following terminology and definitions are provided to promote understanding of the present invention. The terminology and definitions of the prior art are not necessarily consistent with the terminology and definitions of the present invention. Where there is conflict, the following terminology and definitions apply.

streaming audio—Streaming audio is a one-way audio transmission over a data network. The streaming audio referred to herein may come from any number of different sources such as the audio portion of a videoconference session (e.g., host of a Zoom® session), audio of a live streaming event with audio and video, or an audio only source. More specifically, the streaming audio is a one-way transmission, such as from a host (source of the streaming audio) to participants (recipients of the streaming audio), wherein the participants cannot, or are not intended to, send audio back to the host. Feedback or echo may occur if a participant sends audio back to the host.

The streaming audio may be the audio portion of streaming video that is intended to be viewed by the participants. Another example of streaming audio may be the audio of a recorded event, such as a movie, sports, or news event. Certain embodiments of the present invention may be used for "watch parties" wherein participants can watch videos, live or recorded, and interact with one another around them in the same moment. In these embodiments, the streaming audio is the audio of the live or recorded videos. In one embodiment, the watch party may be the watching of a Twitch session, wherein the Twitch session livestreams the game sounds and any simultaneously occurring comments made by the game player(s). In this example, the streaming audio is the audio of the livestream.

Streaming audio is also interchangeably referred to herein as "host-sent audio."

A participant may also receive other sources of streaming audio that are not host-sent. For example, the participant may be listening to Spotify or Pandora on his or her participant computer as background music. As discussed below, the "audio signal copy" is not intended to capture these other sources of streaming audio, and is not intended to be used to cancel out these other sources of streaming audio.

host—The host is a provider of the streaming audio. The host may have a co-host. However, the host and the co-host are collectively referred to herein as the "host." The host need not be the person or entity which initiated the streaming event, and need not be the person or entity on whose server account the streaming event is being held.

participant—The participants are recipients of the streaming audio, and also simultaneously engage in remote audio communications with each other. Each participant thus receives at least two sources of audio, namely, (i) the streaming audio (each participant receives the same streaming audio), and (ii) audio communications inputted by one or more other participants that are in audio communication with each other. Consider, for example, an embodiment with three participants, P1, P2, and P3. P1 receives the streaming audio and any audio communications inputted by P2 and P3. P2 receives the streaming audio and any audio communications inputted by P1 and P3. P3 receives the streaming audio and any audio communications inputted by P2 and P3. In the broadest embodiment, there may be only two participants. There is no technical limitation on the maximum number of participants, but there are practical limitations on the number of participants because each participant is free to communicate with other participants, and thus there may be uncontrollable chatter among the participants unless strict order is maintained on how many participants can speak or be unmuted at one time.

participant computer—Each participant has a participant computer which allows the respective participant to engage in sessions initiated by the host, and to communicate with other participant computers as part of the host-initiated session. Each participant computer includes a microphone that receives any audio communications inputted by the respective participant, such as utterances of the participant. In some instances, the participant must be invited by the host, via their respective computers, to participate in the host-initiated session. In other instances, the host-initiated session is open to any participants who wish to join a host-initiated session. In some instances, the host controls which participant may communicate with each other, whereas in other instances, the participants may independently select which other participants they wish to communicate with.

The participant computer is also interchangeably referred to herein as a "computing device." The participant computer (computing device) may have many different form factors, such as a smartphone or a tablet.

host computer—A host computer provides the source of the streaming audio. Similar to the co-host described above, there may be a co-host computer. However, the host computer and the co-host computer are collectively referred to herein as the "host computer." The co-host, via the co-host computer, may be the actual source of the streaming audio. In this embodiment, the host computer designates the co-host computer to be the source of the streaming audio. Consider, for example, a musician or a disc jockey (DJ) who is the designated co-host for providing the streaming audio. The musician may play live music, whereas the DJ may play recorded music. In the case of a co-host providing the streaming audio, a host server may receive the streaming audio either directly from the co-host computer (along with instructions from the host computer to use the streaming audio of the co-host computer as the source of the streaming audio), or the host server may receive the streaming audio from the co-host computer via the host computer which acts in a relay capacity for the streaming audio. The host computer (also referred to herein as a "host computing device") may have many different form factors, such as a smartphone or a tablet.

host server—A host server functions as a coordinating entity between the host computer and the plurality of participant computers. The host server is in wired or wireless electronic communication with the host computer and the plurality of participant computers via an electronic network, such as the internet. The exact functions of the host server depend upon the system architecture. In one type of system architecture, referred to herein as a "hub and spoke" configuration, all or most of the communications occur through the host server, including the communications between the host computer and the plurality of participant computers, as well as any communications between the plurality of participant computers. Thus, in the example above, any communications between the host computer and P1, P2, and P3 occur through the host server. Likewise, any communications between P1 and P2, or P1 and P3, or P2 and P3 occur through the host server. In addition, acoustic echo cancellation of signals received from P1, P2, and P3, also occurs at the host server.

In another type of system architecture, referred to herein as a "peer-to-peer" configuration, the participant computers electronically communicate directly with each other for certain functions, particularly for conveying "processed audio communication signals" therebetween. In the peer-to-peer configuration, each of the participant computers still receive the streaming audio from the host computer. In the peer-to-peer configuration, acoustic echo cancellation of signals occurs at each of the respective participant computers. In the example above, this means that P1 performs its own acoustic echo cancellation before transmitting its "processed audio communication signals" directly to P2 and P3. Likewise, P2 performs its own acoustic echo cancellation before transmitting its "processed audio communication signals" directly to P1 and P3, and P3 performs its own acoustic echo cancellation before transmitting its "processed audio communication signals" directly to P1 and P2.

Another type of system architecture, referred to herein as a "hybrid" configuration, performs acoustic echo cancellation in a similar manner as the "peer-to-peer" configuration, but communications between the participant computers occur via the host server in the same manner as described above with respect to the "hub and spoke" configuration.

In certain system configuration, the host computer may be part of the host server. Consider, for example, a server farm that is used to implement a "watch party" to a large number of participants. In such a configuration, the host computer may simply be part of the host server, wherein the host server is the portion of the server farm system that comprises the host. This is in contrast to a host which functions using a single server entity, such as when the host is videoconferencing from their computer via Zoom.

audio signal copy—An "audio signal copy" is a digital copy of the frequency waveform of the host-sent streaming audio, and is created directly from the host-sent streaming audio. Since the streaming audio is a continuous waveform, the audio signal copy may thus also be a continuous waveform. While the streaming audio is simply meant to be played on speakers at the respective participant computers, the audio signal copy is intended to be stored in memory for subsequent use in performing acoustic echo cancellation. Timestamps embedded in the audio signal copy are used to ensure that the two waveforms can be synchronized with each other when performing the acoustic echo cancellation. In the "hub and spoke" configuration, the audio signal copy is created in the host server and is stored in memory of the host server, whereas in the "peer to peer" or hybrid configuration, the audio signal copy is created in each of the participant computers and is stored in memory of the respective participant computers.

microphone input signals—The microphone input signals for each participant computer include the host-sent streaming audio outputted by the speaker of the respective participant computer, and any audio communications inputted by the respective participant, such as utterances of the respective participants. Thus, it is inherent in the present invention that the microphone is in close proximity to the participant. The microphone input signals may also include ambient noise picked up from sources in proximity to the participant computer. In addition, the microphone input signals may also include audio communications from other participants that are outputted by the speaker of a respective participant. Consider again, the example of participants P1, P2, and P3. The speaker of P1's computer outputs any audio communications from the participants P2 and P3, which are then included in the microphone input signal of P1's computer. Similar scenarios occur for P2 and P3.

speaker (audio speaker)—A "speaker" as referred to herein refers to an output hardware device that connects to a computer to generate sound. The signal used to produce the sound that comes from a computer speaker is created by the computer's sound card. More specifically, the "speaker" referred to herein outputs sound to the ambient environment, as opposed to an "earphone speaker" or "earphone" or speaker portion of a headphone/headset, all of which are designed to deliver the sound directly to a person's eardrums, while minimizing sound dispersion to the ambient environment. Thus, in the present invention, the microphone input signal ideally would not pick up any sound that might be delivered to an earphone. Of course, if the volume of the earphone is very high, human perceptible sound will travel into the ambient environment, and could be picked up by a microphone. However, this is not the intended use of an earphone, and such an embodiment is excluded by the present invention. Stated another way, the speaker described herein may be characterized as an ambient speaker, or an ambient audio speaker, or a non-earphone-type ambient speaker. In the preferred embodiments of the present invention, the speaker is used to output the host-sent streaming audio at each of the participant computers, so that the respective participants can hear the streaming audio, while simultaneously engaging in remote audio communications with one or more other participants.

The speaker also outputs audio generated by other participants and the microphone input signal for the participant computer will also capture this audio. However, as discussed elsewhere, this audio is not intended to be canceled out by the system components that are dedicated to perform cancellation of the host-sent streaming audio. Also, this audio generated by other participants may be canceled out, filtered, suppressed, or attenuated by other audio processing components of the videoconferencing platform as noted below as part of "signal conditioning," and may be processed differently by different platforms depending upon the capabilities and settings of the respective platforms.

audio communications—"Audio communications" refers to audio inputted by participants into their respective participant computer microphones. Audio communications are thus distinct from the streaming audio which is provided from the host computer.

processed audio communication signals—"Processed audio communication signals" represent the audio signals that are outputted from the microphone input signals of the respective participant computers after the signals have undergone audio signal processing including both (i) acoustic echo cancellation to remove the streaming audio that is received at the respective participant computers, outputted by the speakers of the respective participant computers, and then picked up by the microphones of the respective participant computers, and (ii) signal conditioning to perform one or more of ambient noise suppression, and echo suppression of audio communications from one or more of the participants. The signal conditioning is conventional signal processing performed by existing videoconferencing platforms and is distinct from the acoustic echo cancellation that removes the host-sent streaming audio received at the respective participant computers. The host server or the participant computers may also perform other forms of signal conditioning, other than the two types discussed above.

After removal of the streaming audio, the signals retain any audio communications inputted by the respective participants. The processed audio communication signals for each participant are provided to the remaining participants who are engaged in remote communications with each other. In this manner, the participants may engage in remote audio communications without receiving acoustic echoes of the streaming audio received by other participant computers, while still being able to individually hear the streaming audio outputted from their respective speakers.

In the hub and spoke configuration, the host server performs the audio signal processing, whereas in the peer-to-peer and hybrid configurations, the participant computers perform the audio signal processing.

acoustic echo cancellation (AEC)—AEC, as described herein, refers to a process that removes an originally transmitted audio signal that re-appears, with some delay, in a received audio signal. The re-appearing audio signal is also referred to in the art as "acoustic echoes." The originally transmitted audio signal is removed via a subtraction or deletion process (also, interchangeably referred to as "phase inversion" or "polarity inversion") using an "audio signal copy" of the originally transmitted audio signal. This process is generally implemented digitally using a digital signal processor or software, although it can be implemented in analog circuits as well. This process is also referred to herein as "echo suppression." The originally transmitted audio signal is the host-sent streaming audio described above. The audio signal copy of the originally transmitted audio signal is interchangeably referred to herein as a "copy signal."

Conventional videoconferencing technology automatically removes certain types of background noise, as well as participant-generated audio that is picked up by respective participant computer microphones, when distributing audio signals to participants in a videoconference. These noise cancellation and conventional echo suppression techniques, which are interchangeably referred to herein as "signal conditioning," may be implemented in parallel with the AEC process described herein, which is specifically directed to performing AEC on host-sent streaming audio. The description below does not include details of this conventional videoconferencing technology, but the present invention is fully compatible with such technology to provide an enhanced videoconferencing experience.

II. Detailed Description

Figure 4:
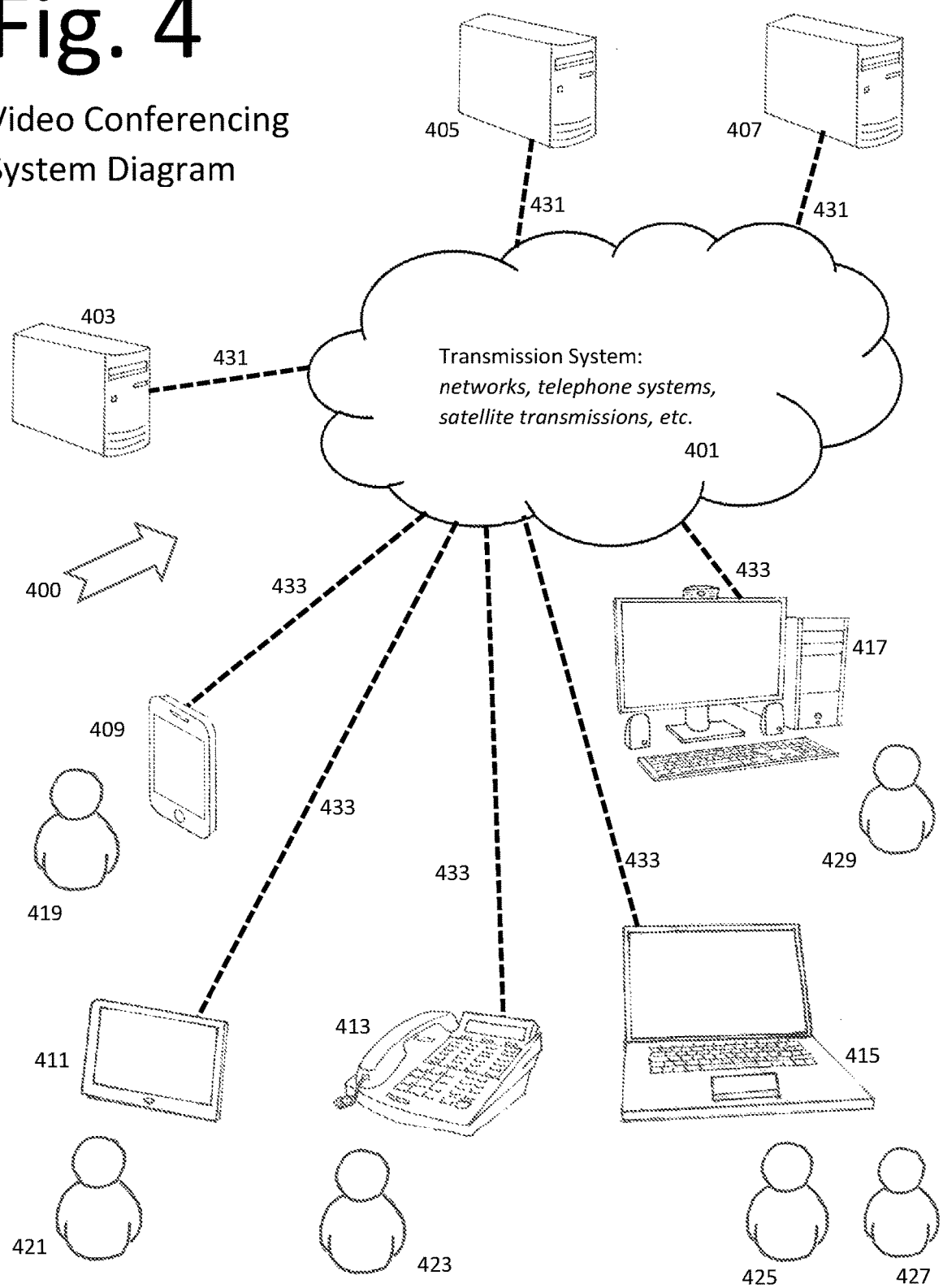
FIG. 4 is a generalized diagram of a video conferencing system in accordance with one preferred embodiment of the present invention.

Consider first FIG. 4 which shows a diagram of a typical video conferencing system, 400, as used in prior art and this invention. The system consists of a number of people (419, 421, 423, 425, 427, 429), participating in the video conference using equipment on their desks or immediate physical environment which will display audio-video from a virtual meeting, as well as gather audio-video for transmission to the virtual meeting (409, 411, 413, 415, 417). This interfacing equipment can include (but is not limited to) a smart phone, 409, a tablet, 411, a laptop computer, 415, or a personal computer (or workstation), 417, and sometimes even a telephone, 413. (Note that a telephone, 413, can only provide access to the audio component of a virtual meeting. However, many video conferencing systems allow this, particularly for large meetings, where the audio of the presentation is more important than the visual. Telephone audio access can also be combined with video access using another device, such as 409, 411, 415, or 417, when the microphone in the other device is not working, or provides lower audio quality.) Interfacing equipment includes handheld devices (409, 411, and some telephones, 413, such as older style home phones, wireless phones, and "non-smart" cell phones), laptop devices (411 and 415), desktop devices (413, 415, and 417). Interfacing equipment includes telephones (409 and 413), full featured computers (415, 417, and even full-featured computers such as Microsoft's Surface Pro, which is produced in a tablet-style configuration, 411) and more limited featured handhelds (such as many smartphones, 409, and tablets, 411).

The term "non-smart" phone refers to phones which do not have CPUs (FIG. 5, 523) and do not transmit their signals using modems (FIG. 5, 521). Such phones may be analog, rather than digital, and do not usually have capabilities for receiving or transmitting video, consequently, they frequently do not have a video screen (529) or webcam (541). They usually have only limited flash memory (at most), and not the kind and amount of memory cache, 527, deployed by this invention.

Of course, more than one person can participate in the conference using the same device, such as two people, 425 and 427, sitting in front of the same laptop computer, 415. This can be the situation for other devices shown (including even a telephone, 413, when it has a speaker instead of or in addition to an earphone). In some cases, specially outfitted physical rooms (not shown) are outfitted with large screen monitors, cameras, speakers, and computing equipment, which perform the same audio-visual display and input-transmission functions as the devices shown. For example, the Zoom company calls rooms outfitted with their equipment "Zoom rooms". A Zoom room permits more than one person—often several people around a table, or even a larger crowd in an auditorium—to join a conference occurring in several locations at the same time.

Nonetheless, even with more than one person in front of and using the same interfacing device, the interfacing device captures only one audio-video stream, so all the people using that device will be referred to collectively, in the description below, as a single Participant or a single Musician.

The interfacing devices are connected to (433) a transmission system (401) and they are connected to each other virtually through a transmission system, 433 and 401. The transmission system, 401, includes, but is not limited to, the Internet and other networks, telephone systems including land line systems, cell phone systems, VOIP (voice over internet protocol) systems, satellite and other radio transmission systems, as well as other wireless transmission systems such as (but not limited to) WiFi and Bluetooth. The interfacing devices may be connected (433) to the transmission system (401) by various ways, including, but not limited to, wire, coaxial cable, Ethernet cable, fiber-optics, WiFi, Bluetooth, and radio transmissions.

Many video conferencing systems also include one or more computer servers "in the cloud", such as 403, 405, and 407, which are connected (431) to the transmission system, 401. These computer servers may perform all of the video and audio processing for the video conferencing system (a central processing system) or only some of the video and audio processing (a system with a mixture of local processing and central processing). (Some peer-to-peer video conferencing systems might not include any such computer servers.) The servers may be multi-purpose, or might have specific capabilities such as data processing, video processing. They may be database servers, web servers, video streaming servers.

Consider now FIG. 5, which is a more schematic view of the components of the video conferencing system in FIG. 4. The remote data source, shown in FIG. 5 as 501, might reside on a computer server, such as those shown in FIG. 4. as 403, 405, 407, or without loss of generality, the data might be distributed among them.

The transmission system shown in FIG. 4 as 401, is shown as bifurcated in FIGS. 5 (511 and 513) in part, because the processing and transmission of audio-only signals from "non-smart" phones (547) do not use modems (505 and 521). In addition, telephone handsets (not shown, but as known to both the general populace as well as practitioners of the art) separate the speaker (held near the ear) and the microphone (held near the mouth) in a way that permits a lower volume of sound and nearly eliminates interference and echo. With such telephones, a person can listen and speak at the same time (full-duplex).

The video conferencing system includes a variety of local devices, with representative examples show (515, 517, and 519). In particular, consider local device, 515, a personal computer, 543, such as, but not limited to, 415 or 417 in FIG. 4. The local device includes a CPU, 523, a memory cache, 527, used in processing, a monitor or screen, 529, and speakers, 533, to display video and audio, respectively, as well as a microphone, 537, and camera (or webcam), 541, for audio and video input (respectively), along with a keyboard, 539, for alphanumeric input, such as for text chat. Note that for many desktop computers, such as pictured in FIG. 4. 417, the monitor, speakers, microphone, webcam, and keyboard are not built into the main housing of the computer as they are in a laptop computer (415), but are connected as accessory peripheral devices. However, they serve the same function, and output to them as well as input from them are processed by the CPU, 523, in the same way. (Other input devices such as pointing devices, as embodied in a touch pad, computer mouse, or touch screen, may be used to control some aspects of a video conferencing system, but are not essential to the novel aspects of this invention, and thus are not pictured.)

In general, input to the local device, 515, via keyboard, 539, microphone, 537, or webcam, 541, is processed in the CPU, 523, then converted by a modem, 521, to signals transmissible through the transmission system, 511.

Local device 517, a handheld device, 545, such as a smart phone (FIG. 4, 409) or tablet (FIG. 4, 411) has the same components: CPU, 523, memory cache, 527, screen, 531, speakers, 533, microphone, 537, webcam 541, keyboard, 539, and modem, 521. Input to a handheld device (515) via keyboard, 539, microphone, 537, or webcam, 541, is processed in the CPU, 523, stored in memory, 527, converted in a modem, 521, and sent to the transmission system, 511, in the same process as for local device, 515.

The signals are transmitted through the transmission system, 511, to other local devices, such as 517, or are transmitted to a remote computer server (FIG. 4, 403, 405, or 407) acting as a remote data source, 501. There, during data exchange, 509, the modem, 505, converts the signal to one which can be processed by the server CPU, 503, which may store the signal, in memory, 502, or retrieve data from memory to help with processing, and then resend to the local devices (such as 513 and 517) via modem, 505, and transmission system, 511. When the data signal reaches a local device such as 515 or 517, the modem, 521 (labeled the same in both devices), converts the signal to one that can be processed by the device CPU, 523. The CPU may store some of the data in memory cache 527, or used data from memory cache to process that data. In any event the CPU, 523, transmits the signal to the screen, 531, and speakers, 533, where it is heard by people (FIGS. 4, 419, 421, 423, 425, 427, and 429) in front of the device, 515 and 517.

In contrast, when the local device, 519, is a telephone, 547, the user of the device can only experience the audio portion of the video conference through the device. Sound from the virtual conference can be heard through the speaker, 535, and input is obtained through the microphone, 537. As mentioned, when both the speaker, 535, and microphone, 537, are in a handset, the separation of these two functions may permit full duplex connections. Consequently, the telephone user might not have need for the present invention, even if other participants in the virtual conference do. When receiving input from the microphone, 537, the audio signal is sent to the circuit board, 525, which converts it for transmission via wire or radio wave to the telephone system, 513, which transmits it to a remote computer server, 501, via a data exchange process, 509 and a phone signal converter, 507. After that, the remote data source might process the digital signal in its CPU, 503, possibly storing some of that information in memory, 502. The CPU may also send a processed signal to the phone signal converter 507, then through the telephone system, 513, to a local device, 519, which is a telephone 547. The circuit board, 525, converts the signal to an audio signal and plays it on the speaker, 535.

Current breakout room systems employ a half-duplex approach, which generally allows only one person to speak. With the filters and algorithms employed, when one person is speaking other speech tends to be suppressed. In some cases, the second speaker's voice is made dominant while the first is suppressed. If no one is speaking, and two people start speaking at once, the system usually suppresses both, with a loud "squawk". For the most part this approach permits an acceptable level of intelligible conversation, and participants understand that only one person can talk at a time.

As mentioned above, when everyone in the videoconference uses headphones, many of the noise suppression issues disappear. However, videoconference platforms are most useful, when headphones are not required.

Figure 6A:
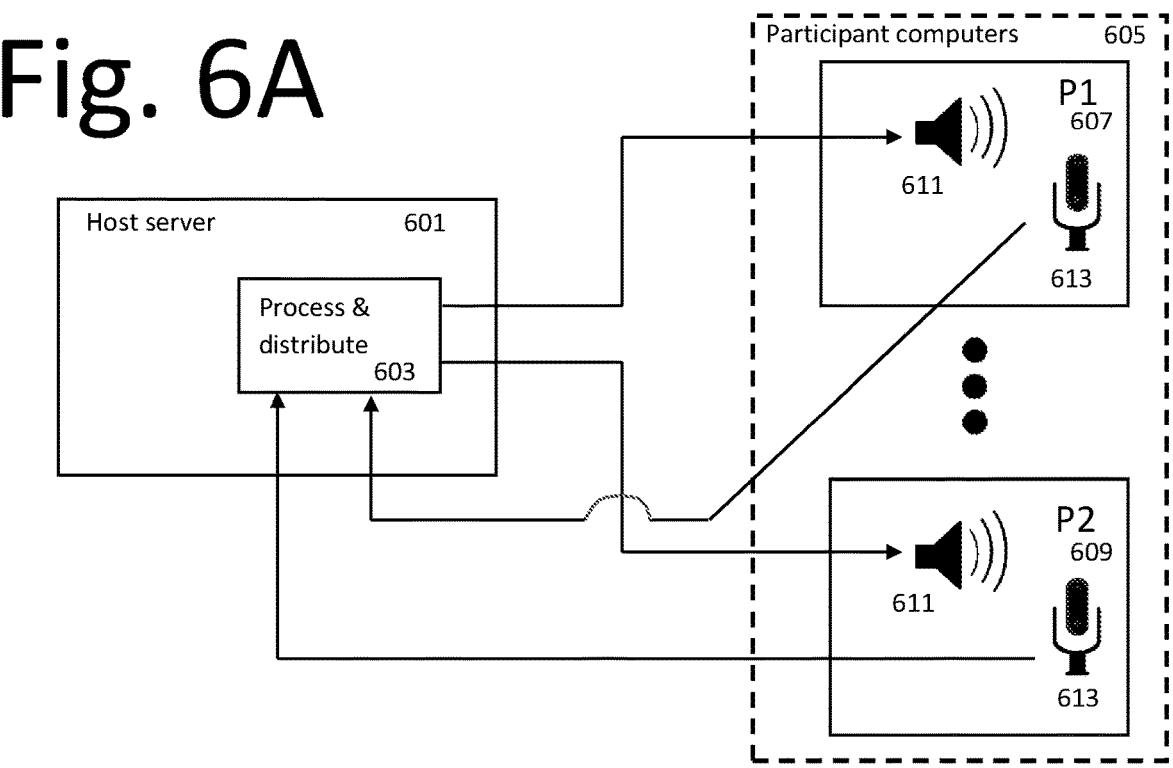
FIG. 6A is a schematic view of the processes involved in a hub-and-spoke videoconferencing platform with noise suppression and echo cancellation being accomplished through central processing.

Consider now FIG. 6A, describing a videoconferencing platform using hub-and-spoke architecture. FIG. 6A also describes a breakout room within such a videoconferencing platform. There may be many participants in a particular videoconference or breakout room, but without loss of generality, FIG. 6A shows only two participants, referred to as P1 and P2. (In FIG. 4, these would be some subset of 419, 421, 423, 425 and 427 collectively, and 429.) The system shown in FIG. 6A includes a host server (601)—or cluster of linked servers serving the same function—as well as the computing devices used by individual participants in a videoconference, referred to as participant computers (605). Only two participant computers are shown, labeled P1 (607) the computer of participant P1, and P2 (609) the computer of participant P2. Each participant computer in FIG. 6A has components shown in FIG. 5, such as a modem (521), CPU (523), monitor or screen (529), memory cache (527), keyboard (539), webcam (541), speakers (533), microphone (537), and other standard ancillary equipment such as a pointing device (not shown in FIG. 5). However only a speaker (611) and microphone (613), are shown in FIG. 6A (or for that matter, the related FIG. 6B), because that is sufficient for the explanatory purposes of the figure.

In the hub-and-spoke architecture shown in FIG. 6A, sound that is captured by the microphones (613) of the participant computers (605), such as P1 (607) and P2 (609), is digitized and sent to the host server (601), where the participant audio streams are processed and distributed (603), then sent back to the participant computers (605) to be turned into soundwaves by the speakers (611) and played aloud to the participants. Step 603 is used to identify any type of signal processing and distribution that may happen in the server (601). For example, in FIG. 6A, the processing (603) of the digitized participant audio signals is done centrally, including signal conditioning such as noise suppression and echo cancellation of audio communications from one or more of the participants. To prevent feedback noise in this half-duplex setting, the processing and distribution circuitry may determine which participant is speaking, and distribute this participant's audio signal—but not other participant's audio signals—to particular participant computers, effectively muting the participants which the server at (603) determines are not the primary speaker. For similar reasons, to prevent feedback noise, the server at (603) does not send the participant audio of one participant (say P1) back to that participant, but only to other participants. This processing, signal conditioning, and distribution of 603 is conventional signal processing such as performed by existing videoconferencing platforms and is distinct from the acoustic echo cancellation of the present invention that removes the host-sent streaming audio received at the respective participant computers. This is only a partial description of the participant audio signal processing and distribution done by the host server (601) at 603. FIG. 6A, for example, may describe the processes of a videoconferencing platform in which participants join a video conference via a web browser by clicking on a link, without having previously downloaded application software for the platform.

Figure 6B:
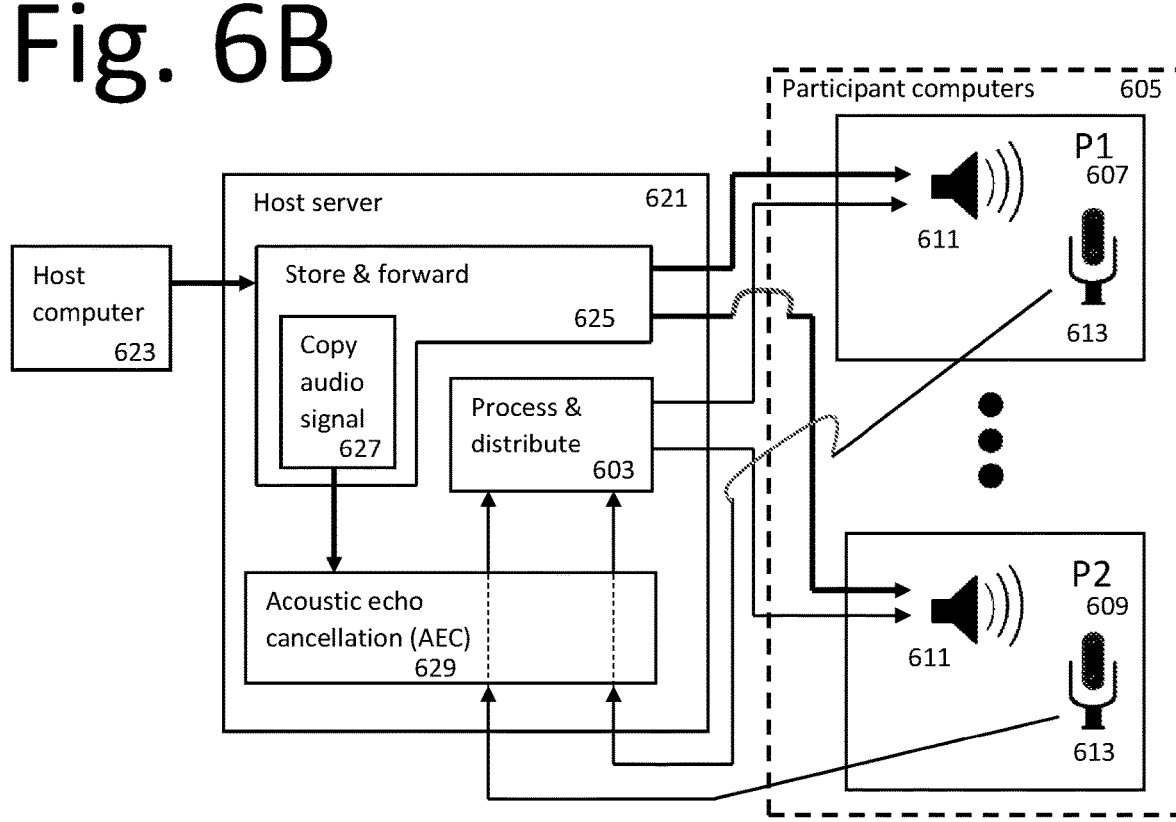
FIG. 6B is a schematic view of the processes involved when one preferred embodiment of the present invention is embodied in a hub-and-spoke platform as described in FIG. 6A.

Now consider FIG. 6B which shows a preferred embodiment of the present invention using similar hub-and-spoke architecture as described in FIG. 6A. Importantly, the participant computers (605) of participants P1 (607) and P2 (609) remain the same in both FIG. 6A and FIG. 6B, and so are labeled identically.

To send an audio stream to all participants, the host directs a host computer (623) to send the audio stream (Host-sent Audio) to the host server (621), where the stream is copied (627), stored (625) at the host server (621), and forwarded to the participant computers (605), where it is played aloud by the speakers (611) on P1 (607) and P2 (609). If participant computers are receiving other audio, whether other participant audio streams, rock music from a YouTube video, or streaming music from a platform such as Pandora or Spotify, the sound card of each participant computer (605) mixes the Host-sent Audio received by that computer with other audio streams received by that computer and plays the audio aloud through the computer speakers (611). (Note that each individual participant may be playing different background or auxiliary audio on his or her computer.)

When each or any participant speaks, the sound of the participant's voice is captured by the microphone (613) of the participant's computer. The captured sound includes Host-sent Audio that had been played aloud through the speaker (611) of that computer, as well as other background sound within the participant's environment. When a participant does not speak, the sound that is captured by the microphone still includes Host-sent Audio that is played aloud through the speaker (611) of that computer, as well as other background sound within the participant's environment. This sound input is digitized in FIG. 6B and sent to the host server (621), as a participant audio stream in a similar manner as in FIG. 6A.

However, in the embodiment described in FIG. 6B, before the participant's respective audio streams are processed and distributed, the participant's respective audio streams are first subject to acoustic echo cancellation (629), also referred to herein as "AEC", at the host server (621). The acoustic echo cancellation process (629) has received an Audio Signal Copy of the original Host-sent Audio signal (627), which is used to individually remove the Host-sent Audio from each participant audio stream, using methods well known to those skilled in the art, including but not limited to phase inversion.

All individual Participant Audio streams are then processed and distributed (603) in the identical manner as in FIG. 6A. Note that the input of individual participant audio streams to 603 is the same in both FIG. 6A and FIG. 6B. That is because the individual Participant Audio streams in FIG. 6B have been "cleaned" or "scrubbed" of the Host-sent Audio. Consequently, at 603, the same methods of noise reduction, echo cancellation, feedback mitigation, and audio stream distribution that are used by hub-and-spoke technology described in FIG. 6A for situations without Host-sent Audio can still be used by the embodiment described in FIG. 6B to additionally process and then distribute the Participant Audio streams.

The above discussion of FIG. 6A and FIG. 6B, has mentioned speakers (611) but not headsets or headphones. If a participant is using a headset instead of a loudspeaker, the Host-sent Audio will not be introduced into the participant audio stream by the microphone (613), so does not need to be deleted from the participant audio stream by acoustic echo cancellation (629). In fact, certain noise and echo suppression methods such as phase inversion will create noise problems if no noise or echo already exists. That is because they introduce a cancelling noise, which becomes mere noise if there is nothing to cancel.

To remedy this, this embodiment uses and accesses the property in today's computers which recognizes the sound device (and the kind of sound device) which is attached to an application and plays the audio produced by the application. If a particular participant, say P1, is using a headset on his or her computer (607), the embodiment has that computer send headset information back to the host server (621). (Because of the effect of headsets on employing and adjusting noise and echo suppression, some video conferencing platforms may already be doing this.) In any event, the host server (621) uses headset information to turn off the acoustic echo cancellation (629) for any individual participant audio stream associated with a participant using a headset. This ensures that the AEC does not introduce extraneous sound to the streams of headset wearers.

Consider now FIG. 7A, describing a videoconferencing platform using hub-and-spoke architecture, but with more distributed processing, such that some (or all) of the noise and echo suppression is processed locally at individual participant computers (711). An example might be a videoconferencing system which requires users to download application software. FIG. 7A also describes a breakout room in such a platform.

Again, there may be many participants in a particular videoconference or breakout room, but without loss of generality, FIG. 7A shows only two participants, referred to as P1 and P2. The system shown in FIG. 7A includes a host server (701)—or cluster of linked servers serving the same function—as well as the computing devices used by individual participants in a videoconference, referred to as participant computers (711). Only two participant computers are shown, labeled P1 (713) the computer of participant P1, and P2 (715) the computer of participant P2. Each participant computer in FIG. 7A has components shown in FIG. 5, such as a modem (521), CPU (523), monitor or screen (529), memory cache (527), keyboard (539), webcam (541), speakers (533), microphone (537), and other standard ancillary equipment (such as a pointing device, not shown). However only a speaker (707) and microphone (709), are shown in FIG. 7A (or for that matter, the related FIG. 7B), because that is sufficient for the explanatory purposes of these figures.

In the hub-and-spoke audio distribution architecture shown in FIG. 7A, sound that is captured by the microphones (709) of the participants computers (711), such as P1 (713) and P2 (715), is digitized. Then the digitized audio may be processed for noise and echo suppression (705) in full or part by the individual participant computers (713, 715), after which the participant audio streams are sent to the host server (701). There the participant audio streams are further processed (703), after which they are distributed (703) by sending them back to the participant computers (711) to be turned into soundwaves by the speakers (707) and played aloud to the participants.

Steps 703 and 705 are used to identify any type of signal processing and distribution that may happen in the host server (701) or the participant computers (713 and 715). This processing and distributing includes signal conditioning such as performing ambient noise suppression, and echo suppression of audio communications from one or more of the participants. The signal conditioning is conventional signal processing such as performed by existing videoconferencing platforms and is distinct from the acoustic echo cancellation of the present invention that removes the host-sent streaming audio received at the respective participant computers. Notice that FIG. 7A is similar to FIG. 6A, except that in FIG. 6A, all of the noise and echo suppression (603) is performed at the host server (601), whereas in FIG. 7A, in addition to audio processing and distribution (703) at the host server (701), some of the noise and echo suppression (705) may be performed at the individual participant computers (711 and 715).

Now consider FIG. 7B which shows an alternate preferred embodiment of the present invention using similar hub-and-spoke architecture as shown in FIG. 7A, with portions of the embodiment's application software distributed among the participant computers (731). In particular, copying of the Host-sent Audio (737) and implementation of the acoustic echo cancellation (labeled AEC at 739) is accomplished at each participant's computer, e.g., the P1 computer (733) and the P2 computer (735), rather than centrally at the host server (721).

Now, to send an audio stream to all participants in the system shown in FIG. 7B, the host directs a host computer (723) to send the audio stream (Host-sent Audio) to the host server (721). At the host server, the Host-sent Audio is not copied as in FIG. 6B, instead it is just forwarded (725) to the participant computers (731). There the Host-sent Audio is copied (737), forwarded to the speakers (707), and sent to the local acoustic echo cancellation software (739). The speakers (707) on P1 (733) and P2 (735) play the audio aloud.

If participant computers are receiving other audio, the sound card of each participant computer (731) mixes the Host-sent Audio received by that computer with other audio streams received by that computer and plays the audio aloud through the computer speakers (707).

When each or any participant speaks, the sound of the participant's voice is captured by the microphone (709) of the participant's computer. The captured sound includes Host-sent Audio that had been played aloud through the speaker (707) of that computer, as well as other background sound within the participant's environment. When a participant does not speak, the sound that is captured by the microphone still includes Host-sent Audio that is played aloud through the speaker (707) of that computer, as well as other background sound within the participant's environment. This sound input is digitized in FIG. 7B. The Host-sent Audio is removed from each participant audio stream using the Audio Signal Copy via acoustic echo cancellation (739), using methods well known to those skilled in the art, including but not limited to phase inversion.

The scrubbed Participant Audio is then processed in part locally (705) in individual participant computers (731) and then sent to the host server (721). At the host server, it is processed and distributed (703) to the individual computers (731), where it is turned into soundwaves by the speakers (707) and played aloud to the participants.

Note that the acoustic echo cancellation (739) incorporated in this embodiment is different and distinct from audio treatments otherwise performed in the system at 705 and 703, even though these other audio treatments might also include noise or echo suppression elements. Note also that the Participant Audio stream as it enters 705 and then 703 in FIG. 7B is the same as that entering 705 and 703 in FIG. 7A. Consequently, the same methods of noise reduction, echo cancellation, and feedback mitigation that are used by the hub-and-spoke technology described in FIG. 7A for situations without Host-sent Audio can still be used by the embodiment described in FIG. 7B to additionally process and then distribute the participant audio streams.

Again, the discussion of FIG. 7A and FIG. 7B, has mentioned speakers (707) but not headsets or headphones. If a participant is using a headset instead of a loudspeaker, the Host-sent Audio will not be introduced into the participant audio stream by the microphone (709), so does not need to be deleted from the participant audio stream by acoustic echo cancellation (709).

Again, to remedy this, this embodiment uses and accesses the property in today's computers which recognizes the sound device which is attached to an application and playing the audio produced by the application. If a particular participant, say P1, is using a headset on his or her computer (733), the acoustic echo cancellation (AEC) component (739) will recognize this and not implement acoustic echo cancellation. This ensures that the AEC does not introduce extraneous sound to the streams of headset wearers.

Figure 8A:
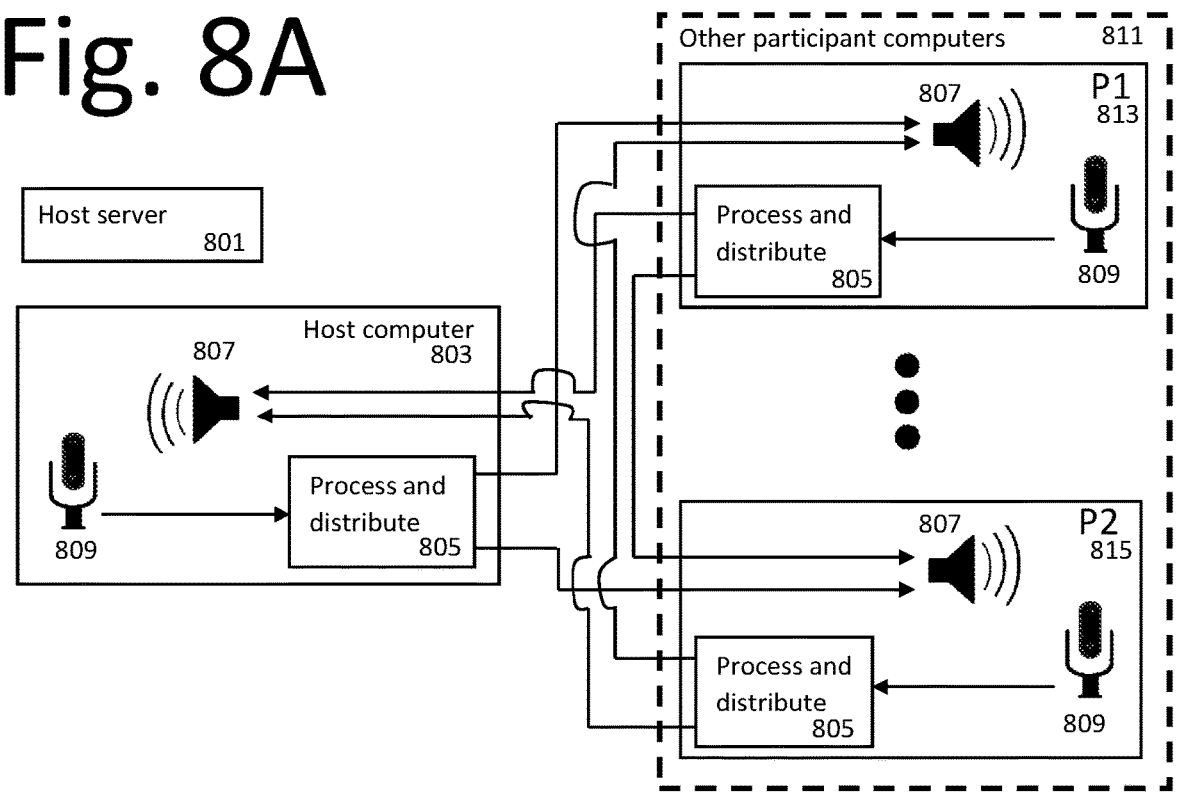
FIG. 8A is a schematic view of the processes involved in a peer-to-peer videoconferencing platform with noise suppression and echo cancellation being accomplished at individual participant computers.

Consider now FIG. 8A, describing a videoconferencing platform using peer-to-peer architecture. All of the noise and echo suppression is processed locally at individual participant computers (811), as well as the host's computer (803), which is treated as a peer. Such a system may employ a host server (801) to help initiate the peer-to-peer videoconference in the same way that Sonobus uses a host server to initiate—but not run—a peer to peer audio conference. FIG. 8A also describes a breakout room in such a platform.

Again, there may be many participants in a particular videoconference or breakout room, but without loss of generality, FIG. 8A shows only two participants, referred to as P1 and P2, plus the host. The system shown in FIG. 8A includes a host server (801)—or cluster of linked servers serving the same function—as well as the computing devices used by individual participants in a videoconference, referred to as participant computers (811), plus the computer of the host (803).

Only two participant computers are shown, labeled P1 (813) the computer of participant P1, and P2 (815) the computer of participant P2. A host computer (803) is also shown as if the host is set up like any other participant so that the host computer (803) also serves as a participant computer. Each participant or host computer in FIG. 8A has components shown in FIG. 5, such as a modem (521), CPU (523), monitor or screen (529), memory cache (527), keyboard (539), webcam (541), speakers (533), microphone (537), and other standard ancillary equipment (such as a pointing device, not shown), however only a speaker (807) and microphone (809), are shown in FIG. 8A (or for that matter, in related FIG. 8B), because that is sufficient for the explanatory purposes of these figures.

In the peer-to-peer audio distribution architecture shown in FIG. 8A, sound that is captured by the microphone (809) of a host computer (803) or participant computer (811), such as P1 (813) and P2 (815), is digitized. Then the digitized audio is processed for noise and echo suppression by the individual participant and host computers (805), after which the participant and host audio streams are distributed to each other using peer-to-peer methods. Upon being received, the audio streams are turned into soundwaves by the speakers (807) and played aloud to the host and participants.

Step 805 is used to identify any type of signal processing and distribution that may happen in the host computer (803) or the participant computers (813 and 815). This processing and distributing includes signal conditioning such as performing ambient noise suppression, and echo suppression of audio communications from one or more of the participants. The signal conditioning is conventional signal processing such as performed by existing videoconferencing platforms and is distinct from the acoustic echo cancellation of the present invention that removes the host-sent streaming audio received at the respective participant computers.

Figure 8B:
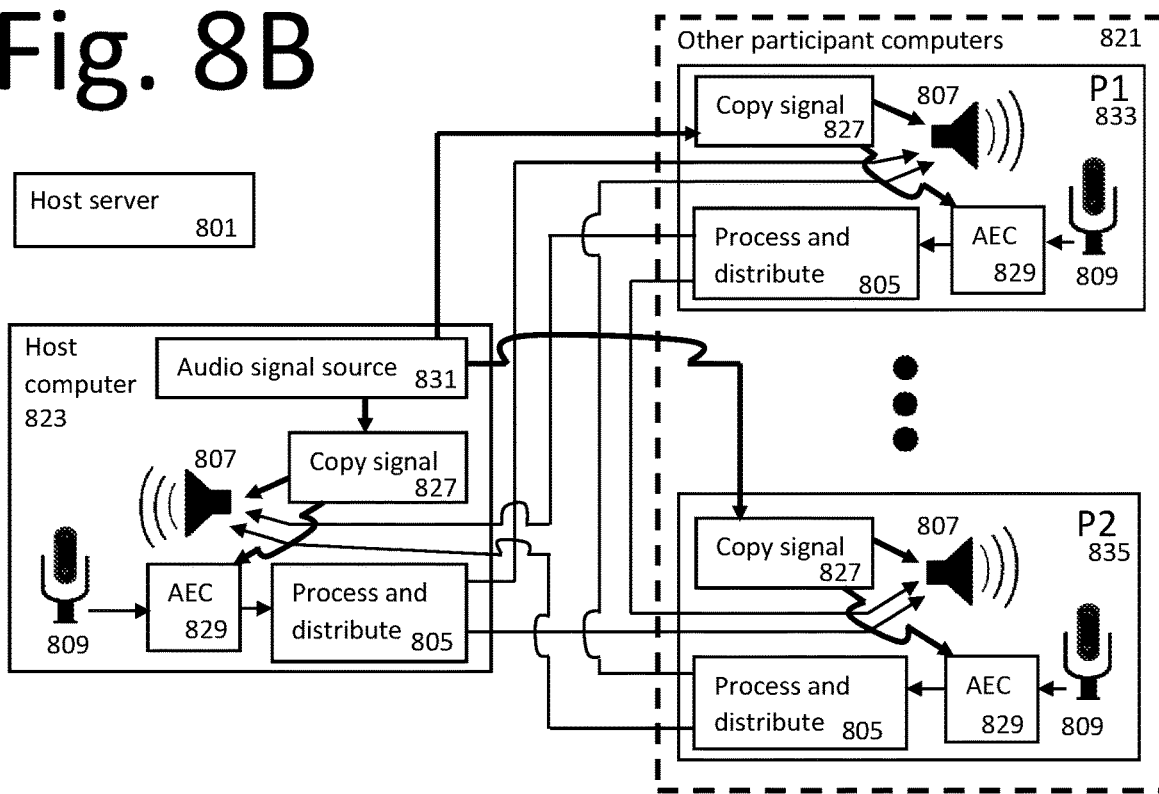
FIG. 8B is a schematic view of the processes involved when another preferred embodiment of the present invention is embodied in a peer-to-peer platform as described in FIG. 8A.

Now consider FIG. 8B which shows an alternate preferred embodiment of the present invention using similar peer-to-peer architecture as shown in FIG. 8A. As in FIG. 8A, the host computer (823) in FIG. 8B also serves as a participant computer. As in FIG. 7B, copying of the Host-sent Audio (827) and implementation of the acoustic echo cancellation (labeled AEC at 829) are accomplished at each participant's computer, e.g., the P1 computer (833) and the P2 computer (835), as well as the host computer (823), rather than centrally at the host server (801). Indeed 737 (Copy signal in FIG. 7B) works the same as 827 (Copy signal in FIG. 8B) and 739 (AEC in FIG. 7B) works the same as 829 (AEC in FIG. 8B).

Now, to send an audio stream to all participants in the system shown in FIG. 8B, the host directs an audio stream (Host-sent Audio) from an audio signal source (831) on the host computer (823) to the sound system of host's own computer (823) and the other participant computers (821). There the Host-sent Audio is copied (827), forwarded to the speakers (807), and sent to the local acoustic echo cancellation software (829). The speakers (807) on P1 (833), P2 (835), and the host computer (823) play the audio aloud.

If participant computers are receiving other audio, the sound card of each participant or host computer mixes the Host-sent Audio received by that computer with other audio streams received by that computer and plays the audio aloud through the computer speakers (807).

When each or any participant speaks, the sound of the participant's voice is captured by the microphone (809) of the participant's computer. The captured sound includes Host-sent Audio that had been played aloud through the speaker (807) of that computer, as well as other background sound within the participant's environment. When a participant does not speak, the sound that is captured by the microphone still includes Host-sent Audio that is played aloud through the speaker (807) of that computer, as well as other background sound within the participant's environment. This sound input is then digitized. The Host-sent Audio is removed from each participant audio stream using the Audio Signal Copy via acoustic echo cancellation (829), using methods well known to those skilled in the art, including but not limited to phase inversion.

The scrubbed Participant Audio is then processed locally (805) in host and individual participant computers (821 and 823) and then distributed to the other peers in the peer-to-peer network, where it is turned into soundwaves by the speakers (807) and played aloud to the participants.

Again, the discussion of FIG. 8A and FIG. 8B, has mentioned speakers (807) but not headsets or headphones. Headphones are dealt with in FIG. 8A and FIG. 8B in the identical way they were dealt with in FIG. 7A and FIG. 7B.

Consider now FIG. 1 describing current (prior art) breakout room technology, using a flow chart for a breakout room with three participants. Call these Participant 1 (referred to in 109), Participant 2 (referred to in 119), and Participant 3 (referred to in 133). (In FIG. 4, these would be some subset of 419, 421, 423, 425 and 427 collectively, and 429.) A similar flow chart describes any breakout room regardless of the number of participants. Without loss of generality, this flow chart shows that Participant 1 is the first to speak (break a silence) in the room. (This assumption is embodied in the steps Participant 2 DOES NOT speak, 119, and Participant 3 DOES NOT speak, 133.) Again without loss of generality, there might be more than one person at any one computer, listening to the videoconference, and speaking into the computer's microphone (for example, in FIG. 4, persons 425 and 427 at device 415), nonetheless, all persons (and their collective voicings) at any one computer station will be referred to as a single participant.

After the Start (101) of a silence, the question (109) is, Does Participant 1 speak? If not, the microphone (FIG. 5, 537 in local device 515 or 517) acting as input to the videoconferencing system (that is, the networked equipment and software, including computers) detects nothing, 125, and the process stops, 139. Of course, the networked equipment, software and platform are ready to start again at 101.

However, if at step 109, Participant 1 does speak, the microphone (FIG. 5, 537 in local device 515, 517, or 519) detects Participant 1's voice, 111, and transmits it to the system, 115. This audio file or waveform is then conveyed through a network (FIG. 5, 511) to the equipment (such as a computer, 543, handheld device, 545, or telephone, 547) of Participant 2 and Participant 3. The audio is converted to sound waves and played on the speaker, 533 or 535, of Participant 2's computer (similar equipment), 117, as well as the speaker, 533, of Participant 3's computer, 131. If there were additional participants, the audio would be transmitted to their equipment, converted to sound waves, and played in the same manner.

Because Participant 1 is speaking, Participant 2 does not speak, 119, or equivalently the system treats Participant 2 as not speaking, muting Participant 2. Likewise, because Participant 1 is speaking, Participant 3 does not speak, 133, or equivalently the system treats Participant 3 as not speaking, muting Participant 3. The same applies to additional participants in a breakout room.

Because Participant 2 does not speak, 119, his or her microphone (FIG. 5, 537) detects nothing, 121. If Participant 2 does speak, but is muted by the system, the system acts as if Participant 2's microphone detects nothing, and the process stops, 139. Likewise, because Participant 3 does not speak, 133, his or her microphone, 537, detects nothing, 135. If Participant 3 does speak, but is muted by the system, the system acts as if Participant 3's microphone detects nothing, and the process stops, 139. Of course, the networked equipment, software and platform are ready to start again at 101.

Figure 2:
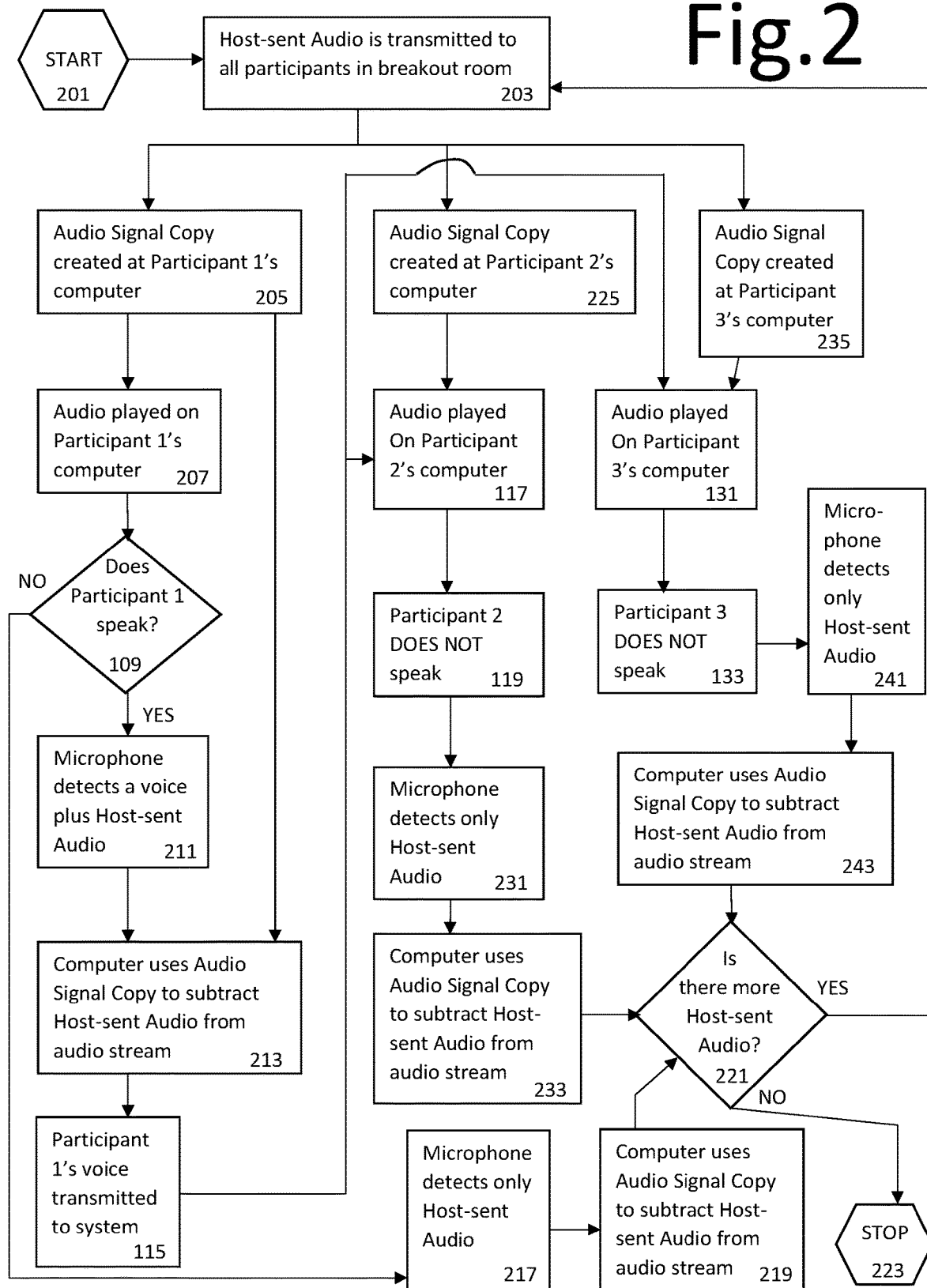
FIG. 2 is a flow chart of one preferred embodiment of the present invention.

In contrast consider FIG. 2 which shows a flow chart of a preferred embodiment of the present invention. FIG. 2 describes a breakout room with three participants: as in FIG. 1, the three participants are indicated as Participant 1 (referred to in 109), Participant 2 (referred to in 119), and Participant 3 (referred to in 133). FIG. 2 describes the case where every participant is at a device with a CPU (523) and memory cache (527), that is, no one is joining the video conference via a telephone (FIG. 5, 547). FIG. 2 describes the case where every participant is listening via the computer speaker (that is, no participant is using a headset or headphones). When some participants use headphones, FIG. 2 is adjusted per discussions above with respect to FIG. 7B and FIG. 8B.

A flow chart similar to FIG. 2 describes any such breakout room regardless of the number of participants. Without loss of generality, this flow chart shows that Participant 1 is the first to speak (break a silence) in the room. (This assumption is embodied in the steps Participant 2 DOES NOT speak, 119, and Participant 3 DOES NOT speak, 133.) Again, without loss of generality, there might be more than one person at any one computer, listening to the videoconference, and speaking into the computer's microphone (for example, in FIG. 4, persons 425 and 427 at device 415), nonetheless, all persons (and their collective voicings) at any one computer station will be referred to as a single participant.

In contrast to FIG. 1, which starts with a silence (even if momentary) in the breakout room, FIG. 2 starts with an audio stream (the Host-sent Audio) being transmitted to every computing device (FIGS. 5, 543 and 545) of every participant in the breakout room.

After the Start (201) the host has the system transmit audio to all the participants of the breakout room, 203. When the electronic encoded version of this audio is received by a participant's computer, the participant's computer's CPU, 523, creates a copy of it, which it stores in memory cache, 527, as in 205 for Participant 1, 225 for Participant 2, and 235 for Participant 3. Then the audio is played on each of the participants' computers' speakers, 533: as in 207 for Participant 1, 117 for Participant 2, and 131 for Participant 3.

Now, the question (109) is, Does Participant 1 speak? If not, the microphone, 537, acting as input to the videoconferencing system (that is, the networked equipment and software, including computers) detects only the Host-sent Audio, 217, being played on the computer speakers, 207 (and 529). The computer's CPU, 523, retrieves the Audio Signal Copy from memory cache, 527, and uses the Audio Signal Copy to subtract the Host-sent Audio from the audio stream, 219. (As noted above, this Audio Signal Copy was made in step 205.) If there is no more Host-sent Audio (221), the process stops, 223. Of course, the networked equipment, software and platform are ready to start again at 201.

However, if at step 109, Participant 1 does speak, the microphone, 537, detects Participant 1's voice and the Host-sent Audio, 211, and processes it in the CPU, 523, by using the Audio Signal Copy (retrieved from memory cache 527) to subtract the Host-sent Audio form the audio stream, 213, so that the audio stream includes Participant 1's voice without the Host-sent Audio. Then Participant 1's voice is transmitted to the system, 115 (and 511). This audio file or waveform is then conveyed through a network (not shown) to the equipment (such as a computer) of Participant 2 and Participant 3.

There the audio stream of Participant 1's voice, along with the continuation of the Host-sent Audio, is played by each of the other participant's computers' speakers 429: at 117 for Participant 2, and 131 for Participant 3.

More particularly, the audio is converted to sound waves by a CPU (523) and played on Participant 2's computer (or similar equipment), 117, as well as Participant 3's computer, 131. If there were additional participants, the audio would be transmitted to their equipment, combined with the Host-sent Audio, converted to sound waves, and played in the same manner.

Because Participant 1 is speaking, Participant 2 does not speak, 119, or equivalently, in a step not shown in FIG. 1, but through processes well known to those practiced in the art, and described in part above, the system treats Participant 2 as not speaking, muting Participant 2. Likewise, because Participant 1 is speaking, Participant 3 does not speak, 133, or equivalently, in a step not shown, but through processes well known to those practiced in the art the system treats Participant 3 as not speaking, muting Participant 3. The same applies to additional participants in a breakout room.

Because Participant 2 does not speak, 119, his or her microphone, (537), detects only the sound of the Host-sent Audio, 231. The computer CPU (523) retrieves the Audio Signal Copy from memory cache (527), and uses the Audio Signal Copy to subtract the Host-sent Audio from the audio stream, 233. (As noted above, this Audio Signal Copy was made in step 225.) Likewise, because Participant 3 does not speak, 133, his or her microphone (537) detects only the sound of the Host-sent Audio, 241. The computer CPU (523) retrieves the Audio Signal Copy from memory cache (527), and uses the Audio Signal Copy to subtract the Host-sent Audio from the audio stream, 243. (As noted above, this Audio Signal Copy was made in step 235.)

Once Participant 1 stops speaking, if there is no more Host-sent Audio (221) the process stops for both Participant 2 and Participant 3, 223. Of course, the networked equipment, software and platform are ready to start again at 201.

Otherwise, if, when Participant 1 stops speaking, the Host-sent Audio continues (221) and the process returns to step 203.

Consider now the case when one or more participants use devices such as a telephone (547) without a CPU (523) or memory cache (527). These devices have handsets, as mentioned above and known to practitioners of the art, with both the speaker, 535, and microphone, 537. Telephone handsets separate the speaker (held near the ear) and the microphone (held near the mouth) in a way that permits a lower volume of sound and nearly eliminates interference and echo. With such telephones, a person can listen and speak at the same time (full-duplex). In other words, in such a telephone device, 535, even as Host-sent Audio is played over the speaker, 535, then at a step analogous to 211, the microphone, 537, would only detect a voice. It would not detect the Host-sent Audio, so step 213 can be eliminated, and Participant 1's voice is transmitted to the system, 513, in a step analogous to 115. In this way FIG. 2 is generalized to include local devices, 519, which are telephones, 547, with handsets, but not speakerphones.

Note: a speakerphone is a telephone with a loudspeaker and microphone, allowing it to be used without picking up the handset. This adds utility to the telephone, but reduces it from a full-duplex device to a half-duplex one.

In an alternate embodiment, a telephone, FIG. 5, 547, with speakerphone capabilities is given (a) a flash memory (not shown), and (b) an upgraded circuit-board, 525. The upgraded circuit-board (i) stores an Audio Signal Copy of the Host-sent Audio to the flash memory, (ii) retrieves the Audio Signal Copy when the microphone, 537, receives an audio signal, and (iii) has filter circuits that filter out the Host-sent Audio from the audio signal, before transmitting the signal to the telephone system, 513. This allows a speakerphone, when used by Participant 1, to follow the flow chart in FIGS. 2, 205, 207, 102, 211, 213, and 135, even though it does not have the generalized computer abilities that require a CPU.

FIG. 2 describes a preferred embodiment of the invention in which the Audio Signal Copy is created at each participant's computer (205, 225, 235) and subsequently used to subtract the Host-sent Audio from the audio stream (213, 233, 221). This implementation would be particularly used in a peer-to-peer environment (FIG. 8B) or a platform with more distributed processing (FIG. 7B). In an alternative hub-and-spoke embodiment (such as FIG. 6B), this subtractive process would be performed centrally at a hosting computer. This alternate embodiment works on a speaker phone. The Audio Signal Copy (step 627 of FIG. 6B) of the Host-sent Audio is made at the remote data source (501) by the CPU (503) and saved in memory (502), prior to being sent to participants (in a step analogous to step 203 of FIG. 2). Likewise, Participant 1's voice with the Host-sent Audio is transmitted back through the telephone system 513, to the remote data source, 501. There, the CPU, 503, retrieves the Audio Signal Copy from memory, 502, and subtracts the Host-sent Audio from the signal (in step 629 of FIG. 6B, analogous to step 213 of FIG. 2) before transmitting it to other participants through 511 and 513.

In yet another alternative embodiment, the subtractive process would be performed by a combination of central servers and individual participants' computers.

In a preferred embodiment, the Host-sent Audio stream is sent to all rooms (and all participants in every room), including all breakout rooms at the same volume setting. In an alternative embodiment, the Host-sent Audio stream is sent to some virtual rooms, but not all such rooms. In an alternative embodiment, the Host-sent Audio stream is sent to different rooms at different volume settings, so that participants in different rooms hear the Host-sent Audio at different volumes. In an alternative embodiment, different Host-sent Audio streams are sent to different rooms and at the same or different volumes.

In an alternative embodiment, each Participant can adjust the volume of the Host-sent Audio stream. In this way the Host-sent Audio stream will be like a whole house music system that is played at different volumes in each room. However, because the Participant's computer knows (or can sense) the volume setting, the Host-sent Audio can be filtered out of the returning audio stream. Notice that every participant hears the Host-sent Audio but at a volume he or she prefers, and consistent with the participant's ability to hear the voices and words of other participants.

In an alternative embodiment, the teachings of this invention can be used to enable a live performance combining together in real-time the music and song of multiple musicians who are located in physically separate locations, but linked through a teleconferencing platform and system such as Zoom. In a preferred embodiment, the musicians need to be interfacing with the videoconferencing system using computing devices with CPUs (523) and memory caches (527).

To do this, each musician receives a Host-sent Audio, which includes separable tempo and tone reference, such as a metronomic beat on a particular pitch. The Host-sent Audio might also include a reference orchestral or choral recording of the work to help the musicians harmonize and blend. Each musician hears the Host-sent Audio, and adds his voice or instrument to the group. The invention then uses the Audio Signal Copy to send this combined audio stream back to the host server, after subtracting everything except (a) the musician's addition (voice or instrument) and (b) the tempo and tone reference. The server then uses software and hardware such as those of Vocalign to automatically synchronize the tempo and tone of the various musicians in real time, after which the tempo and tone reference is subtracted from the audio stream. The resulting multi-voice orchestral and/or choral live performance is then transmitted with a slight delay (due to processing) to the non-musicians participating in the videoconference.

In this embodiment, the non-musicians who hear the performance are not situated in the same room (or breakout room) as any of the musicians. Each musician can perform his or her own part, but cannot hear any other musician. In this sense, each musician might be considered in his or her own breakout room.

Figure 3:
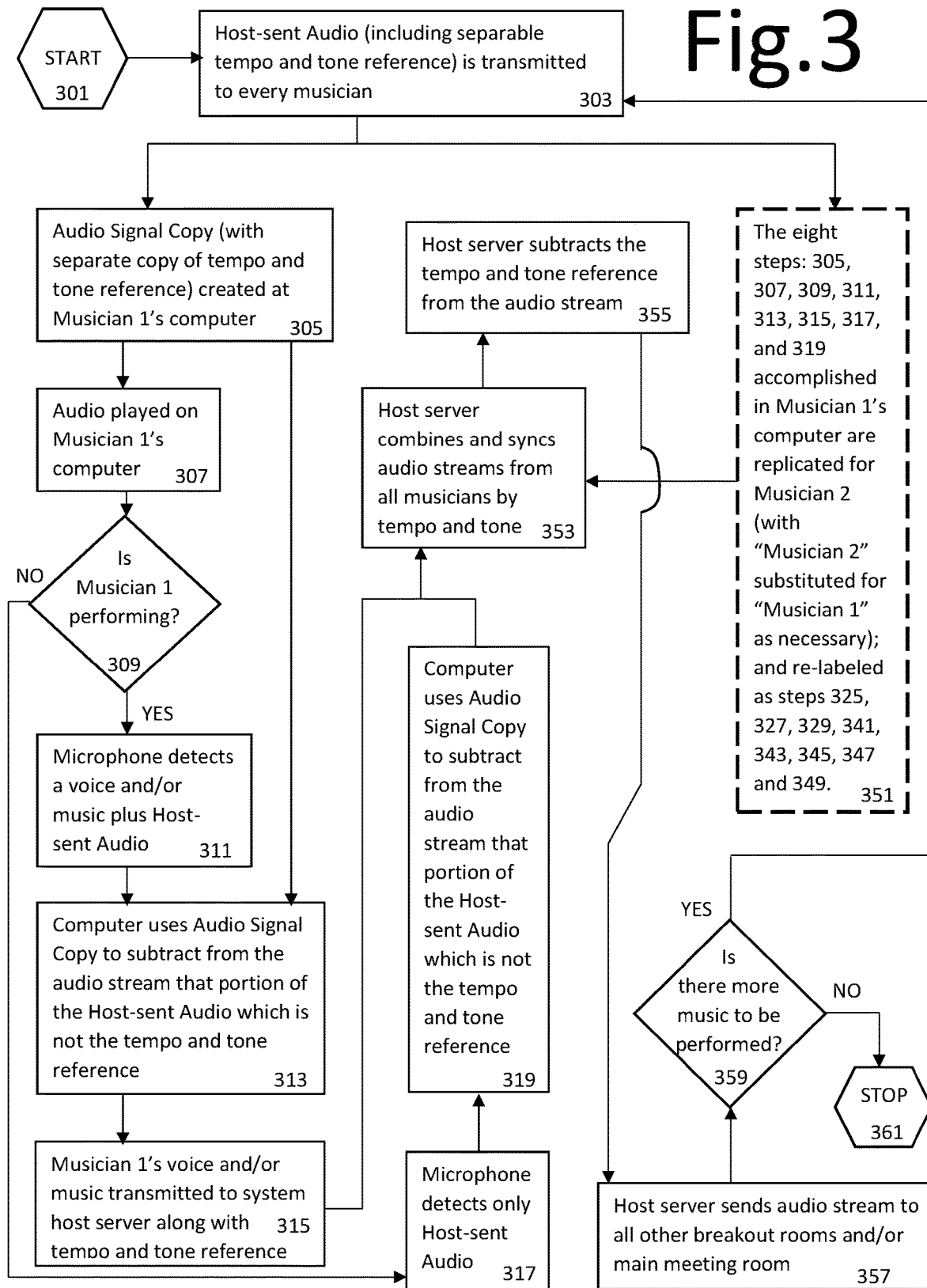
FIG. 3 is a flow chart of an alternative preferred embodiment of the present invention.

For a detailed description, consider FIG. 3, a flow chart of this process. As the process starts, 301, the Host-sent Audio, including separable tempo and tone reference is transmitted to every musician, 303. FIG. 3 focuses on the process flow for two musicians, labeled, without loss of generality, Musician 1 and Musician 2. The details of the process for each are identical, though their audio streams might not be produced in synch. Consequently, and without loss of generality, FIG. 3 shows all details of the process only for Musician 1. However, FIG. 3 does show how the process flows for the two musicians are brought together and their audio streams combined. For the same reason, this diagram can be extrapolated to any number of musicians.

Again, without loss of generality, more than one person might be listening and performing at any one computer (for example, in FIG. 4, persons 425 and 427 at device 415), nonetheless, all persons performing at any one computer or computing station—and their collective voicings (instrumental and vocal)—will be referred to as a single musician for purposes of the flow chart in FIG. 3.

Consider now the next 8 steps in the process that occur after the Host-sent Audio is transmitted to each of the musicians (steps 305, 307, 309, 311, 313, 315, 317, and 319). The steps are essentially identical for each musician, so without loss of generality, consider those with respect to Musician 1 at his or her computing device.

An Audio Signal Copy (with separate copy of tempo and tone reference) is created at Musician 1's computer, 305, by the CPU (523) and stored in memory cache (527). Then the Host-sent Audio is played on the speaker (533) of Musician 1's computer's, 307. The computer queries whether Musician 1 is producing audio (singing, playing an instrument, speaking dialogue, or otherwise performing), 309. If not, then Musician 1's microphone (537) detects only the Host-sent Audio, 317. The computer CPU (523) retrieves the Audio Signal Copy from the memory cache (527), uses the Audio Signal Copy to subtract from the audio stream that portion of the Host-sent Audio which is not the tempo and tone reference 319. That is, when leaving step 319, the audio only consists of the tempo and tone reference channel.

On the other hand, If Musician 1 is performing (309), the microphone (537) detects a voice and/or music plus the Host-sent Audio played in the background, 311. The computer CPU (523) uses the Audio Signal Copy (retrieved from memory cache, 527) to subtract from the audio stream that portion of the host-sent Audio which is not the tempo and tone reference, 313. After that, Musician 1's voice and/or music is transmitted to the system, 511, and the host server (501) along with a tempo and tone reference channel, 315. As the Musician 1 alternates between performing and not performing, a continuous electronic audio stream issues out of 315 and 319 (alternately) being transmitted from Musician 1's computer through a network (such as the Internet) to the videoconferencing host sever, 353 (and 501).

At approximately the same time as steps 305, 307, 309, 311, 313, 315, 317, and 319 are being executed at Musician 1's computer, the same processes are being executed at Musician 2's computer. The eight steps: 305, 307, 309, 311, 313, 315, 317, and 319 accomplished in Musician 1's computer are replicated for Musician 2 (and with "Musician 2" substituted for "Musician 1" as necessary) in Musician 2's computer; and re-labeled as steps 325, 327, 329, 341, 343, 345, 347 and 349 respectively (351). The resulting continuous electronic audio stream from Musician 2's computer is transmitted through a network, 511, (such as the Internet) to the videoconferencing host server, 353 (and 501).

The process of transmitting the Host-sent Audio to different musicians, and then receiving the return audio with added musical stylings may have induced some time lags, so that the host server does not receive the audio streams at the same time. In addition, the audio reproduction and recording equipment (speakers and microphones) at each musician's computer may have induced variations in tempo and tone. At step 353, the host server CPU (503) uses processes such in Vocalign by Synchro Arts to synchronize the tempos and tones of the various audio streams received from the various musicians. While FIG. 3 shows the flow chart for only two musicians (Musician 1 and Musician 2), it is evident that the process can be expanded without limitation or loss of generality to any countable number of musicians.

After that, the host server CPU (503) subtracts the tempo and tone reference from the audio stream, 355, and sends the stream to all other participants in the video conference through the transmission system (511 and 513), who may be in various rooms (main, breakout, or otherwise), 357. If there is no more music to be performed (359) the process stops, 361. Otherwise, the process continues as more Host-sent Audio (with separable tempo and tone reference channel) is transmitted to the musicians, 303.

The processing functions performed by the host server, host computer, and respective participant computers are preferably implemented in software code which is executed on any suitable processor or collection of processors, whether provided in a single computer or distributed among multiple computers, within the respective host server, host computer and participant computer. While not shown in the figures, each of the host server, host computer, and respective participant computers include such processors.

The software code can be included in an article of manufacture (e.g., one or more tangible computer program products) having, for instance, non-transitory computer readable storage media. The storage media has computer readable program code stored therein that is encoded with instructions for execution by a processor for providing and facilitating the mechanisms of the present invention.

The storage media can be any known media, such as computer memory, one or more floppy discs, compact discs, optical discs, magnetic tapes, flash memories, circuit configurations in Field Programmable Gate Arrays or other semiconductor devices, or other tangible computer storage medium. The storage media can be transportable, such that the program or programs stored thereon can be loaded onto one or more different computers or other processors to implement various aspects of the present invention as discussed above.

It should be appreciated by those skilled in the art that various modifications and variations may be made to the present invention without departing from the scope and spirit of the invention. It is intended that the present invention include such modifications and variations as come within the scope of the present invention.

What is claimed is:

1. A method of participant-individualized audio volume control of streaming audio for a plurality of participants who are each receiving the streaming audio from a host within a videoconferencing platform, and who are also simultaneously engaged in remote audio communications with each other within the same videoconferencing platform, the plurality of participants each having a participant computer configured to receive the streaming audio and to engage in the remote audio communications, each participant computer including a speaker and a microphone, the streaming audio having a volume, and the remote audio communications having a volume, the method comprising:
   (a) providing, by a host computer, the streaming audio from the host to the plurality of participant computers;
   (b) each of the participant computers independently receiving the streaming audio from the host computer and playing the streaming audio via their respective speakers so that each of the respective participants hears the streaming audio while simultaneously engaging in remote audio communications with each other via the speakers and microphones of the respective participant computers,
      wherein the streaming audio is received by each of the participant computers from the host computer within the same videoconferencing platform that is used to allow the participant computers to simultaneously engage in remote audio communications with each other; and
   (c) each of the participant computers individually adjusting the volume of the streaming audio being received by their respective computer, separate from the volume of the remote audio communications, so that each participant hears the streaming audio at their individually adjusted volume,
      wherein the volume of the streaming audio is individually adjustable from the volume being received by the respective computer from the host computer to an audible, unmuted volume that allows the participant to hear the streaming audio at their individually adjusted volume, the audible, unmuted volume including a volume that is lower than the volume being received by the respective computer from the host computer.

2. The method of claim 1 wherein the videoconferencing platform has one or more breakout rooms, and a subset of the plurality of participants are engaging in the remote audio communications within the same breakout room.

3. The method of claim 1 wherein the source of the streaming audio is audio of a live streaming event provided by the host, and the remote audio communications are audio of a group of the participants who are experiencing the live streaming event and remotely communicating with each other during the live streaming event via the same videoconferencing platform.

4. The method of claim 1 wherein the source of the streaming audio is audio of a videoconference session established by the host, and the remote audio communications are audio of a breakout session of the videoconference session being attended by a subset of the plurality of participants.

5. The method of claim 1 wherein the remote audio communications include utterances of the respective participants.

6. A computer-implemented apparatus for providing participant-individualized audio volume control of streaming audio for a plurality of participants who are each receiving the streaming audio from a host within a videoconferencing platform, and who are also simultaneously engaged in remote audio communications with each other within the same videoconferencing platform, the plurality of participants each having a participant computer configured to receive the streaming audio and to engage in the remote audio communications, each participant computer including a speaker and a microphone, the streaming audio having a volume, and the remote audio communications having a volume, the apparatus comprising:
   (a) a host computer configured to provide the streaming audio from the host to the plurality of participant computers; and
   (b) software code executed on a processor of each participant computer which is configured to:
      (i) independently receive the streaming audio from the host computer and play the streaming audio via their respective speakers so that each of the respective participants hears the streaming audio while simultaneously engaging in remote audio communications with each other via the speakers and microphones of the respective participant computers, wherein the streaming audio is received by each of the participant computers from the host computer within the same videoconferencing platform that is used to allow the participant computers to simultaneously engage in remote audio communications with each other, and (ii) individually adjust the volume of the streaming audio being received by their respective computer at the direction of the individual participant, separate from the volume of the remote audio communications, so that each participant hears the streaming audio at their individually adjusted volume, wherein the volume of the streaming audio is individually adjustable from the volume being received by the respective computer from the host computer to an audible, unmuted volume that allows the participant to hear the streaming audio at their individually adjusted volume, the audible, unmuted volume including a volume that is lower than the volume being received by the respective computer from the host computer.

7. The computer-implemented apparatus of claim 6 wherein the videoconferencing platform has one or more breakout rooms, and a subset of the plurality of participants are engaging in the remote audio communications within the same breakout room.

8. The computer-implemented apparatus of claim 6 wherein the source of the streaming audio is audio of a live streaming event provided by the host, and the remote audio communications are audio of a group of the participants who are experiencing the live streaming event and remotely communicating with each other during the live streaming event via the same videoconferencing platform.

9. The computer-implemented apparatus of claim 6 wherein the source of the streaming audio is audio of a videoconference session established by the host, and the remote audio communications are audio of a breakout session of the videoconference session being attended by a subset of the plurality of participants.

10. The computer-implemented apparatus of claim 6 wherein the remote audio communications include utterances of the respective participants.

11. A method of host-customized audio volume control of streaming audio for a plurality of participants who are each receiving the streaming audio from a host within a videoconferencing platform, and who are also simultaneously engaged in remote audio communications with each other within the same videoconferencing platform, the videoconference platform having a plurality of different breakout rooms and defining a plurality of subsets of participants, each subset of participants being associated with a different breakout room, the plurality of participants each having a participant computer configured to receive the streaming audio and to engage in the remote audio communications with other participants in their respective breakout rooms, each participant computer including a speaker and a microphone, the streaming audio having a volume, and the remote audio communications having a volume, the method comprising:

(a) providing, by a host computer, the streaming audio from the host to the plurality of participant computers;

(b) each of the participant computers independently receiving the streaming audio from the host computer and playing the streaming audio via their respective speakers so that each of the respective participants hears the streaming audio while simultaneously engaging in remote audio communications with the other participants in their respective breakout rooms via the speakers and microphones of the respective participant computers, wherein the streaming audio is received by each of the participant computers from the host computer within the same videoconferencing platform that is used to allow the participant computers to simultaneously engage in remote audio communications with the other participants in their respective breakout rooms; and (c) the host computer individually adjusting the volume of the streaming audio being sent to each of the breakout rooms and being received by the participant computers, separate from the volume of the remote audio communications, so that each participant in a respective breakout room hears the streaming audio at the same host-customized adjusted volume for that particular breakout room, wherein the streaming audio being sent to different breakout rooms have audible, unmuted volumes that are different from each other.

12. The method of claim 11 wherein the source of the streaming audio is audio of a live streaming event provided by the host, and the remote audio communications are audio of one of the subsets of the participants who is experiencing the live streaming event in their associated breakout room and remotely communicating with each other during the live streaming event via the same videoconferencing platform.

13. The method of claim 11 wherein the remote audio communications include utterances of the respective participants.

14. A computer-implemented apparatus for providing host-customized audio volume control of streaming audio for a plurality of participants who are each receiving the streaming audio from a host within a videoconferencing platform, and who are also simultaneously engaged in remote audio communications with each other within the same videoconferencing platform, the videoconference platform having a plurality of different breakout rooms and defining a plurality of subsets of participants, each subset of participants being associated with a different breakout room, the plurality of participants each having a participant computer configured to receive the streaming audio and to engage in the remote audio communications with other participants in their respective breakout rooms, each participant computer including a speaker and a microphone, the streaming audio having a volume, and the remote audio communications having a volume, the apparatus comprising:

(a) a host computer configured to provide the streaming audio from the host to the plurality of participant computers;

(b) software code executed on a processor of each participant computer which is configured to independently receive the streaming audio from the host computer and play the streaming audio via their respective speakers so that each of the respective participants hears the streaming audio while simultaneously engaging in remote audio communications with the other participants in their respective breakout rooms via the speakers and microphones of the respective participant computers, wherein the streaming audio is received by each of the participant computers from the host computer within the same videoconferencing platform that is used to allow the participant computers to simultaneously engage in remote audio communications with the other participants in their respective breakout rooms; and (c) software code executed on the host computer which is configured to individually adjust the volume of the streaming audio being sent to each of the breakout rooms and being received by the participant computers, separate from the volume of the remote audio communications, so that each participant in a respective breakout room hears the streaming audio at the same host-customized adjusted volume for that particular breakout room, wherein the streaming audio being sent to different breakout rooms have audible, unmuted volumes that are different from each other.

15. The apparatus of claim 14 wherein the source of the streaming audio is audio of a live streaming event provided by the host, and the remote audio communications are audio of one of the subsets of the participants who is experiencing the live streaming event in their associated breakout room and remotely communicating with each other during the live streaming event via the same videoconferencing platform.

16. The apparatus of claim 14 wherein the remote audio communications include utterances of the respective participants.

* * * * *

UNITED STATES PATENT AND TRADEMARK OFFICE
CERTIFICATE OF CORRECTION

PATENT NO. : 11,282,532 B1
APPLICATION NO. : 17/459250
DATED : March 22, 2022
INVENTOR(S) : Slotznick It is certified that error appears in the above-identified patent and that said Letters Patent is hereby corrected as shown below:

In the Specification

Column 7, Line 46: change "P2 and P3" to read --P1 and P2--

Signed and Sealed this
Twenty-first Day of June, 2022

*Katherine Kelly Vidal*

Katherine Kelly Vidal
*Director of the United States Patent and Trademark Office*